US010908785B2

(12) United States Patent
Borkar et al.

(10) Patent No.: US 10,908,785 B2
(45) Date of Patent: Feb. 2, 2021

(54) SYSTEMS AND METHODS FOR SAAS OVERLAYS USING AN EMBEDDED BROWSER

(71) Applicant: Citrix Systems, Inc., Fort Lauderdale, FL (US)

(72) Inventors: Vipin Borkar, Bengaluru (IN); Santosh Sampath, Bengaluru (IN); Deepak Sharma, Bengaluru (IN); Arvind SankaraSubramanian, Bengaluru (IN)

(73) Assignee: Citrix Systems, Inc, Fort Lauderdale, FL (US)

( * ) Notice: Subject to any disclaimer, the term of this patent is extended or adjusted under 35 U.S.C. 154(b) by 0 days.

(21) Appl. No.: 16/182,191

(22) Filed: Nov. 6, 2018

(65) Prior Publication Data

US 2020/0142552 A1 May 7, 2020

(51) Int. Cl.

*G06F 3/00* (2006.01)
*G06F 3/0483* (2013.01)
*H04L 29/08* (2006.01)
*H04L 29/06* (2006.01)

(52) U.S. Cl.

CPC ............ *G06F 3/0483* (2013.01); *H04L 67/22* (2013.01); *H04L 67/42* (2013.01)

(58) Field of Classification Search

CPC ..... G06N 3/0445; H04L 67/02; H04L 67/125; H04L 41/14; H04L 41/5058; H04L 67/22; H04L 67/42; G06F 3/0483

See application file for complete search history.

(56) References Cited

U.S. PATENT DOCUMENTS

| | | | | |
|---|---|---|---|---|
| 8,108,459 | B1 * | 1/2012 | Hoffman | H04L 65/403 709/203 |
| 9,116,888 | B1 * | 8/2015 | Wang | G06F 16/00 |
| 2012/0139940 | A1 | 6/2012 | Chavanne | |
| 2012/0144286 | A1 * | 6/2012 | Bank | G06F 17/241 715/230 |
| 2016/0110322 | A1 | 4/2016 | Miller et al. | |
| 2018/0096434 | A1 * | 4/2018 | Aggarwal | G06Q 40/12 |

(Continued)

OTHER PUBLICATIONS

Yao Qiong et al., Effective (frame-based Strategy for Processing Dynamic Data in Embedded Browser, Feb. 26, 2010, IEEE Computer Society, pp. 538-542 (Year: 2010).*

(Continued)

*Primary Examiner* — Tam T Tran
(74) *Attorney, Agent, or Firm* — Foley & Lardner LLP

(57) ABSTRACT

Embodiments described include systems and methods for displaying overlays for a network application. A client application on a client device can establish a session to a network application accessed via an embedded browser of the client application. The embedded browser of the client application may receive and display a web page of the network application. Based on one or more conditions and/or policies, the client application may identify and display overlay content over the web page in the embedded browser. The overlay content may include, but is not limited to, training videos, tutorials, social options (e.g., emoticons, likes), form help text, form autofill suggestions, and/or navigation assistance. Once the overlay content is presented, feedback can be received in order to modify the subsequent overlays.

20 Claims, 15 Drawing Sheets

(56) References Cited

U.S. PATENT DOCUMENTS

2018/0275846 A1* 9/2018 Perret .................. G06F 16/245

OTHER PUBLICATIONS

Yuchen Zhou et al., Understanding and Monitoring Embedded Web Scripts, May 1, 2015, IEEE Computer Society, pp. 850-865 (Year: 2015).*
Extended Search Report for EP Appl. No. 19207259.3, dated Mar. 9, 2020.

* cited by examiner

SYSTEMS AND METHODS FOR SAAS OVERLAYS USING AN EMBEDDED BROWSER

FIELD OF THE DISCLOSURE

The present application generally relates to management of applications, including but not limited to systems and methods for displaying software-as-a-service (SaaS) overlays using an embedded browser.

BACKGROUND

As the workforce of an enterprise becomes more mobile and work under various conditions, an individual can use one or more client devices, including personal devices, to access network resources such as web applications. Due to differences between the client devices and the manner in which network resources can be accessed, there are significant challenges to the enterprise in managing access to network resources and monitoring the usage of resources as well as providing sufficient level of support to its users.

BRIEF SUMMARY

The present disclosure is directed towards systems and methods for displaying overlays on a network application via an embedded browser on a client device. SaaS applications, also referred to as network applications, are not easily customizable by the enterprise and such customizations require large costs to be paid to software consultants. Furthermore, the workflow of SaaS applications can be complex causing users to need training on usage. This training can decrease user productivity and cost the organization. In addition, SaaS applications can be monotonous which decreases user engagement. To address the previously mentioned concerns, an embedded browser within a client application on a client device can display overlay content on top of a network application. The overlay content may provide the user with training videos, tutorials, social options (e.g., emoticons, likes), form help text, form autofill suggestions, or navigation assistance. Once the overlay content is presented, feedback can be received in order to modify the subsequent overlays.

A client application on a client device can establish a session to a network application accessed via an embedded browser of the client application. The embedded browser of the client application may receive and display a web page of the network application. The client application may identify one or more overlays to be displayed over the web page in the embedded browser based on one or more conditions or policies. The client application may display the one or more overlays over the web page in the embedded browser. In certain embodiments, the embedded browser may display the one or more overlays over the web page or contents of the web page. In some embodiments, the client application can receive and maintain data relating to the display of the one or more overlays over the web page. This data could be further utilized to modify future overlay content.

In one aspect, this disclosure is directed to a method for displaying one or more overlays for a network application accessed via an embedded browser of the client application. The method includes, establishing, by a client application on a client device, one or more sessions to one or more network applications accessed via an embedded browser of the client application. The method includes receiving, by the embedded browser of the client application, a web page of a network application of the one or more network applications. The method includes identifying, by the client application based at least on the network application, one or more overlays to be displayed over the web page in the embedded browser. The method includes displaying, by the client application, the one or more overlays over the web page in the embedded browser.

In some embodiments, the embedded browser is integrated into the client application. In some embodiments, the network application comprises an application hosted on a server accessed by the client device via a network, the entity of the server different from the entity of the client device. In some embodiments, the method may include identifying a form of the web page.

In some embodiments, the method may include identifying the one or more overlays based on the form of the webpage of the network application. In some embodiments, the one or more overlays comprise a navigation element prompting the user to interact with a portion of the web page. In some embodiments, the method may include identifying one or more overlays to be displayed further comprises identifying the one or more overlays based on a policy for the network application.

In some embodiments, the method may include displaying, by the embedded browser, the one or more overlays. In some embodiments, the one or more overlays are provided to the client application via a second entity different from an entity of the server hosting the network application.

In some embodiments, the method may include maintaining, by the client application in a data structure, statistics relating to the display of the one or more overlays over the web page in the embedded browser. In some embodiments, the method may include transmitting, by the client application, the statistics relating to the display of the one or more overlays to a second entity different from an entity of the server hosting the network application, the statistics used by the second entity to inform i) the provider of the network application to update the network application based on the statistics received from a plurality of client applications including the client application or ii) an entity generating the overlays to update one or more overlays based on the statistics received from a plurality of client applications including the client application.

In another aspect, this disclosure is directed to a system for displaying one or more overlays for a network application accessed via an embedded browser of the client application. The system includes a client application on a client device in communication with a first server of a first entity, via an embedded browser of the client application. The client application can establish one or more sessions to one or more network applications accessed via an embedded browser of the client application. The client application can receive, by the embedded browser of the client application, a web page of a network application of the one or more network applications. The client application can identify based at least on the network application, one or more overlays to be displayed over the web page in the embedded browser. The client application can display the one or more overlays over the web page in the embedded browser.

In some embodiments, the embedded browser is integrated into the client application. In some embodiments the network application comprises an application hosted on a server accessed by the client device via a network, the entity of the server different from the entity of the client device. In some embodiments, the system can identify based at least on the network application, one or more overlays to be displayed over the web page in the embedded browser, the client application is further configured to identify a form of the web page.

In some embodiments, the client application can identify a form of the web page, the client application is further configured to the one or more overlays based on the form of the webpage of the network application. In some embodiments, the one or more overlays include a navigation element prompting the user to interact with a portion of the web page. In some embodiments, the client application can identify based at least on the network application, one or more overlays to be displayed over the web page in the embedded browser, the client application is further configured to identify the one or more overlays based on a policy for the network application.

In some embodiments, the client application can display the one or more overlays over the web page in the embedded browser the client application is further configured to display, by the embedded browser, the one or more overlays. In some embodiments, the one or more overlays are provided to the client application via a second entity different from an entity of the server hosting the network application. In some embodiments, the client application is further configured to maintain in a data structure, statistics relating to the display of the one or more overlays over the web page in the embedded browser.

In some embodiments, the client application is further configured to transmit the statistics relating to the display of the one or more overlays to a second entity different from an entity of the server hosting the network application, the statistics used by the second entity to inform i) the provider of the network application to update the network application based on the statistics received from a plurality of client applications including the client application or ii) an entity generating the overlays to update one or more overlays based on the statistics received from a plurality of client applications including the client application.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 6 is an example representation of an implementation for browser redirection using a secure browser plug-in;

Figure 1:
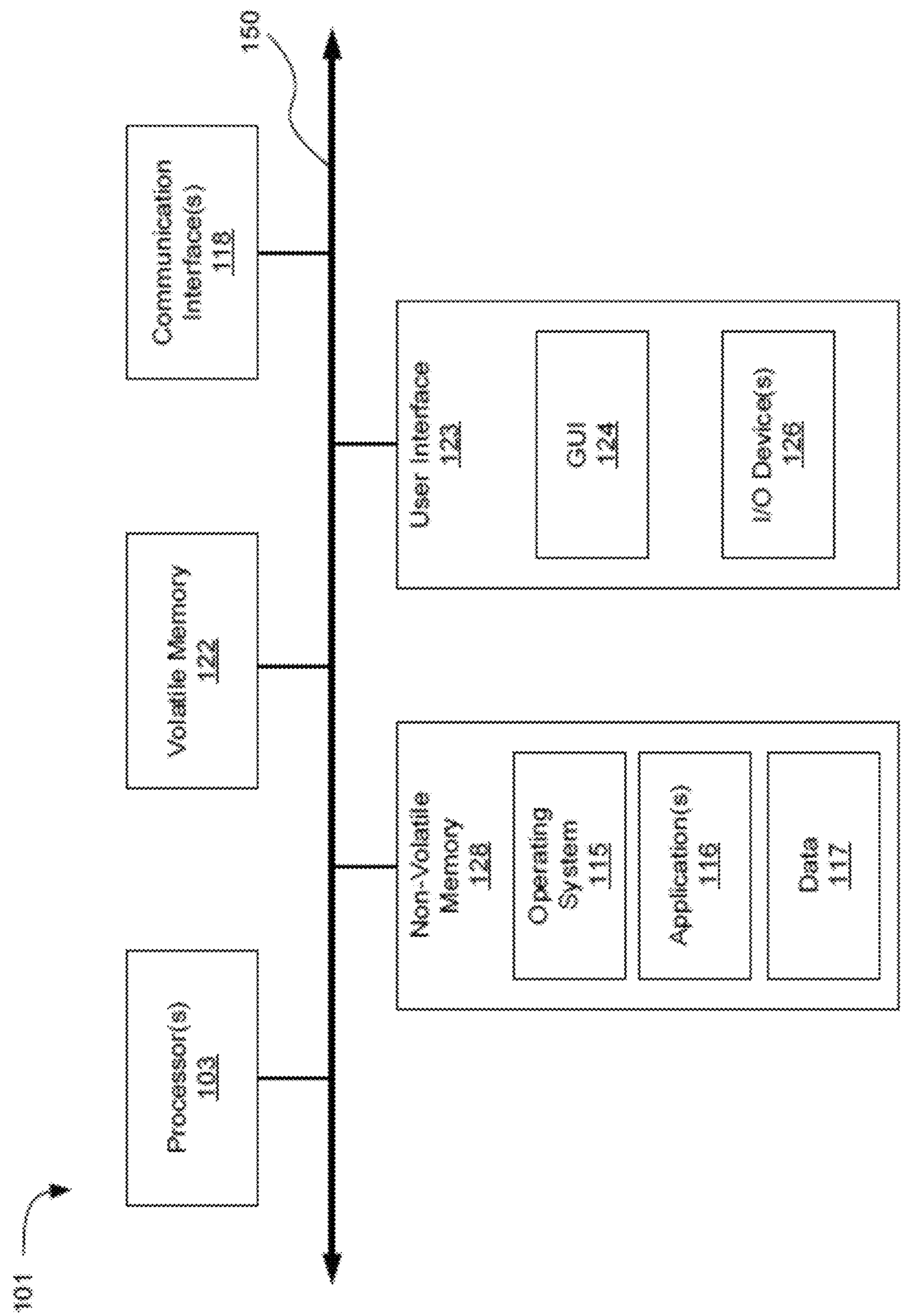
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein.

Section B describes systems and methods for an embedded browser.

Section C describes systems and methods for displaying overlays for a network application.

A. Computing Environment

Prior to discussing the specifics of embodiments of the systems and methods detailed herein in Section B, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor (s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for an Embedded Browser

The present disclosure is directed towards systems and methods of an embedded browser. A client application executing on a client device can allow a user to access applications (apps) that are served from and/or hosted on one or more servers, such as web applications and software-as-a-service (SaaS) applications (hereafter sometimes generally referred to as network applications). A browser that is embedded or integrated with the client application can render to the user a network application that is accessed or requested via the client application, and can enable interactivity between the user and the network application. The browser is sometimes referred to as an embedded browser, and the client application with embedded browser (CEB) is sometimes referred to as a workspace application. The client application can establish a secure connection to the one or more servers to provide an application session for the user to access the network application using the client device and the embedded browser. The embedded browser can be integrated with the client application to ensure that traffic related to the network application is routed through and/or processed in the client application, which can provide the client application with real-time visibility to the traffic (e.g., when decrypted through the client application), and user interactions and behavior. The embedded browser can provide a seamless experience to a user as the network application is requested via the user interface (shared by the client application and the embedded browser) and rendered through the embedded browser within the same user interface.

The client application can terminate one end of a secured connection established with a server of a network application, such as a secure sockets layer (SSL) virtual private network (VPN) connection. The client application can receive encrypted traffic from the network application, and can decrypt the traffic before further processing (e.g., rendering by the embedded browser). The client application can monitor the received traffic (e.g., in encrypted packet form), and also have full visibility into the decrypted data stream and/or the SSL stack. This visibility can allow the client application to perform or facilitate policy-based management (e.g., including data loss prevention (DLP) capabilities), application control (e.g., to improve performance, service level), and collection and production of analytics. For instance, the local CEB can provide an information technology (IT) administrator with a controlled system for deploying web and SaaS applications through the CEB, and allow the IT administrator to set policies or configurations via the CEB for performing any of the forgoing activities.

Many web and SaaS delivered applications connect from web servers to generic browsers (e.g., Internet Explorer, Firefox, and so on) of users. Once authenticated, the entire session of such a network application is encrypted. However, in this scenario, an administrator may not have visibility, analytics, or control of the content entering the network application from the user's digital workspace, or the content leaving the network application and entering the user's digital workspace. Moreover, content of a network application viewed in a generic browser can be copied or downloaded (e.g., by a user or program) to potentially any arbitrary application or device, resulting in a possible breach in data security.

This present systems and methods can ensure that traffic associated with a network application is channeled through a CEB. By way of illustration, when a user accesses a SaaS web service with security assertion markup language (SAML) enabled for instance, the corresponding access request can be forwarded to a designated gateway service that determines, checks or verifies if the CEB was used to make the access request. Responsive to determining that a CEB was used to make the access request, the gateway service can perform or provide authentication and single-sign-on (SSO), and can allow the CEB to connect directly to the SaaS web service. Encryption (e.g., standard encryption) can be used for the application session between the CEB and the SaaS web service. When the content from the web service is unencrypted in the CEB to the viewed via the embedded browser, and/or when input is entered via the CEB, the CEB can provide added services on selective application-related information for control and analytics for instance. For example, an analytics agent or application programming interface (API) can be embedded in the CEB to provide or perform the added services.

The CEB (sometimes referred to as workspace application or receiver) can interoperate with one or more gateway services, intermediaries and/or network servers (sometimes collectively referred to as cloud services or Citrix Cloud) to provide access to a network application. Features and elements of an environment related to the operation of an embodiment of cloud services are described below.

Figure 2:
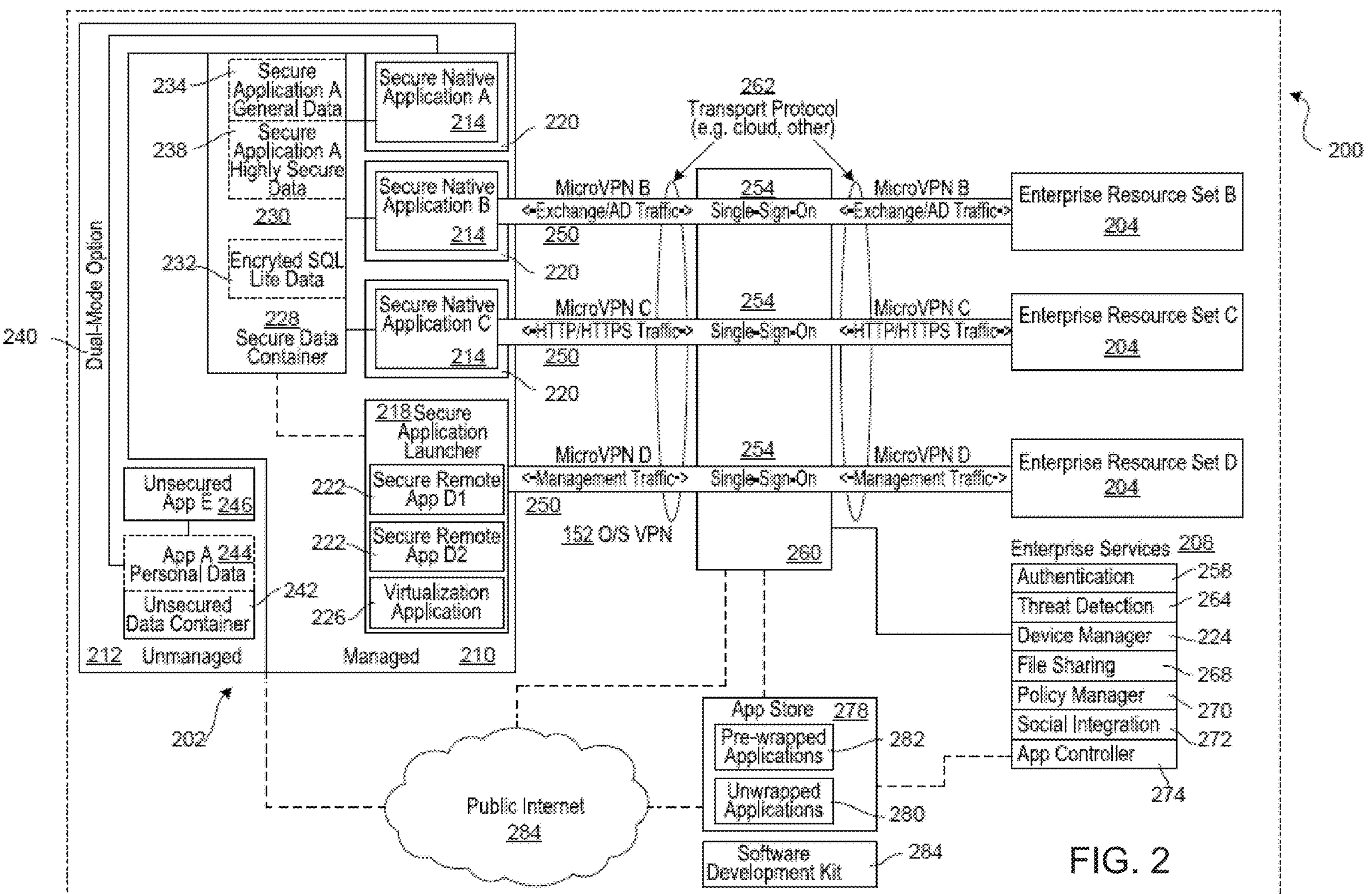
FIG. 2 is a block diagram of an illustrative embodiment of cloud services for use in accessing resources.

FIG. 2 illustrates an embodiment of cloud services for use in accessing resources including network applications. The cloud services can include an enterprise mobility technical architecture 200, which can include an access gateway 260 in one illustrative embodiment. The architecture can be used in a bring-your-own-device (BYOD) environment for instance. The architecture can enable a user of a client device 204 (e.g., a mobile or other device) to both access enterprise or personal resources from a client device 202, and use the client device 204 for personal use. The user may access such enterprise resources 204 or enterprise services 208 via a client application executing on the client device 204. The user may access such enterprise resources 204 or enterprise services 208 using a client device 204 that is purchased by the user or a client device 202 that is provided by the enterprise to user. The user may utilize the client device 202 for business use only or for business and personal use. The client device may run an iOS operating system, and Android operating system, or the like. The enterprise may choose to implement policies to manage the client device 204. The policies may be implanted through a firewall or gateway in such a way that the client device may be identified, secured or security verified, and provided selective or full access to the enterprise resources. The policies may be client device management policies, mobile application management policies, mobile data management policies, or some combination of client device, application, and data management policies. A client device 204 that is managed through the application of client device management policies may be referred to as an enrolled device. The client device management policies can be applied via the client application for instance.

In some embodiments, the operating system of the client device may be separated into a managed partition 210 and an unmanaged partition 212. The managed partition 210 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the client device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is not accessible by unmanaged apps and devices.

The secure applications may be email applications, web browsing applications, software-as-a-service (SaaS) access applications, Windows Application access applications, and the like. The client application can include a secure application launcher 218. The secure applications may be secure native applications 214, secure remote applications 222 executed by the secure application launcher 218, virtualization applications 226 executed by the secure application launcher 218, and the like. The secure native applications 214 may be wrapped by a secure application wrapper 220. The secure application wrapper 220 may include integrated policies that are executed on the client device 202 when the secure native application is executed on the device. The secure application wrapper 220 may include meta-data that points the secure native application 214 running on the client device 202 to the resources hosted at the enterprise that the secure native application 214 may require to complete the task requested upon execution of the secure native application 214. The secure remote applications 222 executed by a secure application launcher 218 may be executed within the secure application launcher application 218. The virtualization applications 226 executed by a secure application launcher 218 may utilize resources on the client device 202, at the enterprise resources 204, and the like. The resources used on the client device 202 by the virtualization applications 226 executed by a secure application launcher 218 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 204, and the like. The resources used at the enterprise resources 204 by the virtualization applications 226 executed by a secure application launcher 218 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application may use the user interaction data as an input to the application operating on the server. In this arrangement, an enterprise may elect to maintain the application on the server side as well as data, files, etc., associated with the application. While an enterprise may elect to "mobilize" some applications in accordance with the principles herein by securing them for deployment on the client device (e.g., via the client application), this arrangement may also be elected for certain applications. For example, while some applications may be secured for use on the client device, others might not be prepared or appropriate for deployment on the client device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the client device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the client device. The enterprise can use a client application, which can include a virtualization application, to allow access to applications that are deemed more properly operated on the server side. In an embodiment, the virtualization application may store some data, files, etc., on the mobile phone in one of the secure storage locations. An enterprise, for example, may elect to allow certain information to be stored on the phone while not permitting other information.

In connection with the virtualization application, as described herein, the client device may have a virtualization application that is designed to present GUIs and then record user interactions with the GUI. The virtualization application may communicate the user interactions to the server side to be used by the server side application as user interactions with the application. In response, the application on the server side may transmit back to the client device a new GUI. For example, the new GUI may be a static page, a dynamic page, an animation, or the like, thereby providing access to remotely located resources.

The secure applications may access data stored in a secure data container 228 in the managed partition 210 of the client device. The data secured in the secure data container may be accessed by the secure wrapped applications 214, applications executed by a secure application launcher 222, virtualization applications 226 executed by a secure application launcher 218, and the like. The data stored in the secure data container 228 may include files, databases, and the like. The data stored in the secure data container 228 may include data restricted to a specific secure application 230, shared among secure applications 232, and the like. Data restricted to a secure application may include secure general data 234 and highly secure data 238. Secure general data may use a strong form of encryption such as Advanced Encryption Standard (AES) 128-bit encryption or the like, while highly secure data 238 may use a very strong form of encryption such as AES 256-bit encryption. Data stored in the secure data container 228 may be deleted from the device upon receipt of a command from the device manager 224. The secure applications may have a dual-mode option 240. The dual mode option 240 may present the user with an option to operate the secured application in an unsecured or unmanaged mode. In an unsecured or unmanaged mode, the secure applications may access data stored in an unsecured data container 242 on the unmanaged partition 212 of the client device 202. The data stored in an unsecured data container may be personal data 244. The data stored in an unsecured data container 242 may also be accessed by unsecured applications 248 that are running on the unmanaged partition 212 of the client device 202. The data stored in an unsecured data container 242 may remain on the client device 202 when the data stored in the secure data container 228 is deleted from the client device 202. An enterprise may want to delete from the client device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The client device 202 may connect to enterprise resources 204 and enterprise services 208 at an enterprise, to the public Internet 248, and the like. The client device may connect to enterprise resources 204 and enterprise services 208 through virtual private network connections. The virtual private network connections, also referred to as microVPN or application-specific VPN, may be specific to particular applications (e.g., as illustrated by microVPNs 250), particular devices, particular secured areas on the client device (e.g., as illustrated by O/S VPN 252), and the like. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 254. The single-sign-on processes may allow a user to provide a single set of authentication credentials, which are then verified by an authentication service 258. The authentication service 258 may then grant to the user access to multiple enterprise resources 204, without requiring the user to provide authentication credentials to each individual enterprise resource 204.

The virtual private network connections may be established and managed by an access gateway 260. The access gateway 260 may include performance enhancement features that manage, accelerate, and improve the delivery of enterprise resources 204 to the client device 202. The access gateway may also re-route traffic from the client device 202 to the public Internet 248, enabling the client device 202 to access publicly available and unsecured applications that run on the public Internet 248. The client device may connect to the access gateway via a transport network 262. The transport network 262 may use one or more transport protocols and may be a wired network, wireless network, cloud network, local area network, metropolitan area network, wide area network, public network, private network, and the like.

The enterprise resources 204 may include email servers, file sharing servers, SaaS/Web applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 204 may be premise-based resources, cloud based resources, and the like. The enterprise resources 204 may be accessed by the client device 202 directly or through the access gateway 260. The enterprise resources 204 may be accessed by the client device 202 via a transport network 262. The transport network 262 may be a wired network, wireless network, cloud network, local area network, metropolitan area network, wide area network, public network, private network, and the like.

Cloud services can include an access gateway 260 and/or enterprise services 208. The enterprise services 208 may include authentication services 258, threat detection services 264, device manager services 224, file sharing services 268, policy manager services 270, social integration services 272, application controller services 274, and the like. Authentication services 258 may include user authentication services, device authentication services, application authentication services, data authentication services and the like. Authentication services 258 may use certificates. The certificates may be stored on the client device 202, by the enterprise resources 204, and the like. The certificates stored on the client device 202 may be stored in an encrypted location on the client device, the certificate may be temporarily stored on the client device 202 for use at the time of authentication, and the like. Threat detection services 264 may include intrusion detection services, unauthorized access attempt detection services, and the like. Unauthorized access attempt detection services may include unauthorized attempts to access devices, applications, data, and the like. Device management services 224 may include configuration, provisioning, security, support, monitoring, reporting, and decommissioning services. File sharing services 268 may include file management services, file storage services, file collaboration services, and the like. Policy manager services 270 may include device policy manager services, application policy manager services, data policy manager services, and the like. Social integration services 272 may include contact integration services, collaboration services, integration with social networks such as Facebook, Twitter, and LinkedIn, and the like. Application controller services 274 may include management services, provisioning services, deployment services, assignment services, revocation services, wrapping services, and the like.

The enterprise mobility technical architecture 200 may include an application store 278. The application store 278 may include unwrapped applications 280, pre-wrapped applications 282, and the like. Applications may be populated in the application store 278 from the application controller 274. The application store 278 may be accessed by the client device 202 through the access gateway 260, through the public Internet 248, or the like. The application store may be provided with an intuitive and easy to use User Interface.

A software development kit 284 may provide a user the capability to secure applications selected by the user by providing a secure wrapper around the application. An application that has been wrapped using the software development kit 284 may then be made available to the client device 202 by populating it in the application store 278 using the application controller 274.

The enterprise mobility technical architecture 200 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 3:
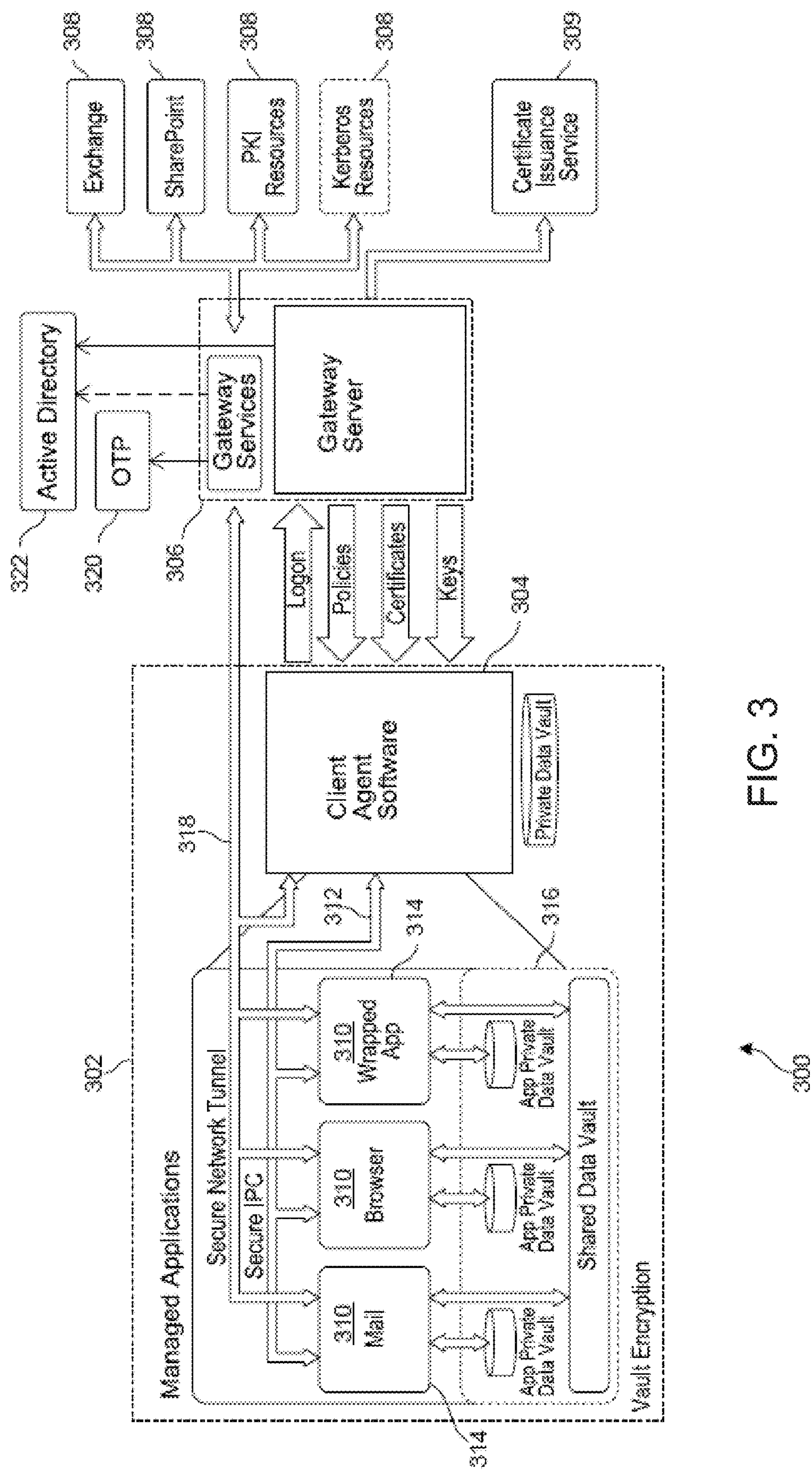
FIG. 3 is a block diagram of an example embodiment of an enterprise mobility management system.

FIG. 3 depicts is an illustrative embodiment of an enterprise mobility management system 300. Some of the components of the mobility management system 200 described above with reference to FIG. 2 have been omitted for the sake of simplicity. The architecture of the system 300 depicted in FIG. 3 is similar in many respects to the architecture of the system 200 described above with reference to FIG. 2 and may include additional features not mentioned above.

In this case, the left hand side represents an enrolled client device 302 with a client agent 304, which interacts with gateway server 306 to access various enterprise resources 308 and services 309 such as Web or SasS applications, Exchange, Sharepoint, public-key infrastructure (PKI) Resources, Kerberos Resources, Certificate Issuance service, as shown on the right hand side above. The gateway server 306 can include embodiments of features and functionalities of the cloud services, such as access gateway 260 and application controller functionality. Although not specifically shown, the client agent 304 may be part of, and/or interact with the client application which can operate as an enterprise application store (storefront) for the selection and/or downloading of network applications.

The client agent 304 can act as a UI (user interface) intermediary for Windows apps/desktops hosted in an Enterprise data center, which are accessed using the High-Definition User Experience (HDX) or Independent Computing Architecture (ICA) display remoting protocol. The client agent 304 can also support the installation and management of native applications on the client device 302, such as native iOS or Android applications. For example, the managed applications 310 (mail, browser, wrapped application) shown in the figure above are native applications that execute locally on the device. Client agent 304 and application management framework of this architecture act to provide policy driven management capabilities and features such as connectivity and SSO (single sign on) to enterprise resources/services 308. The client agent 304 handles primary user authentication to the enterprise, for instance to access gateway (AG) with SSO to other gateway server components. The client agent 304 obtains policies from gateway server 306 to control the behavior of the managed applications 310 on the client device 302.

The Secure interprocess communication (IPC) links 312 between the native applications 310 and client agent 304 represent a management channel, which allows client agent to supply policies to be enforced by the application management framework 314 "wrapping" each application. The IPC channel 312 also allows client agent 304 to supply credential and authentication information that enables connectivity and SSO to enterprise resources 308. Finally the IPC channel 312 allows the application management framework 314 to invoke user interface functions implemented by client agent 304, such as online and offline authentication.

Communications between the client agent 304 and gateway server 306 are essentially an extension of the management channel from the application management framework 314 wrapping each native managed application 310. The application management framework 314 requests policy information from client agent 304, which in turn requests it from gateway server 306. The application management framework 314 requests authentication, and client agent 304 logs into the gateway services part of gateway server 306 (also known as NetScaler access gateway). Client agent 304 may also call supporting services on gateway server 306, which may produce input material to derive encryption keys for the local data vaults 316, or provide client certificates which may enable direct authentication to PKI protected resources, as more fully explained below.

In more detail, the application management framework 314 "wraps" each managed application 310. This may be incorporated via an explicit build step, or via a post-build processing step. The application management framework 314 may "pair" with client agent 304 on first launch of an application 310 to initialize the Secure IPC channel and obtain the policy for that application. The application management framework 314 may enforce relevant portions of the policy that apply locally, such as the client agent login dependencies and some of the containment policies that restrict how local OS services may be used, or how they may interact with the application 310.

The application management framework 314 may use services provided by client agent 304 over the Secure IPC channel 312 to facilitate authentication and internal network access. Key management for the private and shared data vaults 316 (containers) may be also managed by appropriate interactions between the managed applications 310 and client agent 304. Vaults 316 may be available only after online authentication, or may be made available after offline authentication if allowed by policy. First use of vaults 316 may require online authentication, and offline access may be limited to at most the policy refresh period before online authentication is again required.

Network access to internal resources may occur directly from individual managed applications 310 through access gateway 306. The application management framework 314 is responsible for orchestrating the network access on behalf of each application 310. Client agent 304 may facilitate these network connections by providing suitable time limited secondary credentials obtained following online authentication. Multiple modes of network connection may be used, such as reverse web proxy connections and end-to-end VPN-style tunnels 318.

The Mail and Browser managed applications 310 can have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture can support the incorporation of various other security features. For example, gateway server 306 (including its gateway services) in some cases might not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 306 may identify managed native applications 310 that are allowed to have access to more sensitive data using strong authentication, and ensure that access to these applications is only permitted after performing appropriate authentication, even if this means a re-authentication is requested from the user after a prior weaker level of login.

Another security feature of this solution is the encryption of the data vaults 316 (containers) on the client device 302. The vaults 316 may be encrypted so that all on-device data including clipboard/cache data, files, databases, and configurations are protected. For on-line vaults, the keys may be stored on the server (gateway server 306), and for off-line vaults, a local copy of the keys may be protected by a user password or biometric validation. When data is stored locally on the device 302 in the secure container 316, it is preferred that a minimum of AES 256 encryption algorithm be utilized.

Other secure container features may also be implemented. For example, a logging feature may be included, wherein all security events happening inside an application 310 are logged and reported to the backend. Data wiping may be supported, such as if the application 310 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector might cause multiple copies of the same encrypted data to yield different cipher text output, preventing both replay and cryptanalytic attacks. This may also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented via the CEB, wherein after a policy-defined period of inactivity, a user session is terminated.

Data leakage from the application management framework 314 may be prevented in other ways. For example, when an application 310 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 320 without the use of an AD (active directory) 322 password for access to one or more applications. In some cases, some users do not know (or are not permitted to know) their AD password, so these users may authenticate using an OTP 320 such as by using a hardware OTP system like SecurID (OTPs may be provided by different vendors also, such as Entrust or Gemalto). In some cases, after a user authenticates with a user ID, a text is sent to the user with an OTP 320. In some cases, this may be implemented only for online use, with a prompt being a single field.

An offline password may be implemented for offline authentication for those applications 310 for which offline use is permitted via enterprise policy. For example, an enterprise may want storefront to be accessed in this manner. In this case, the client agent 304 may require the user to set a custom offline password and the AD password is not used. Gateway server 306 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 310 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 304 may be retrieved by gateway server 306 and used in a keychain. Each managed application may have one associated client certificate, identified by a label that is defined in gateway server 306.

Gateway server 306 may interact with an Enterprise special purpose web service to support the issuance of client certificates to allow relevant managed applications to authenticate to internal PKI protected resources.

The client agent 304 and the application management framework 314 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate might never be present in the iOS keychain and might not be persisted except potentially in "online-only" data value that is strongly protected.

Mutual SSL or TLS may also be implemented to provide additional security by requiring that a client device 302 is authenticated to the enterprise, and vice versa. Virtual smart cards for authentication to gateway server 306 may also be implemented.

Both limited and full Kerberos support may be additional features. The full support feature relates to an ability to do full Kerberos login to Active Directory (AD) 322, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 310 is not running.

A multi-site architecture or configuration of enterprise application store and an application controller may be supported that allows users to be service from one of several different locations in case of failure.

In some cases, managed applications 310 may be allowed to access a certificate and private key via an API (example OpenSSL). Trusted managed applications 310 of an enterprise may be allowed to perform specific Public Key operations with an application's client certificate and private key. Various use cases may be identified and treated accordingly, such as when an application behaves like a browser and no certificate access is used, when an application reads a certificate for "who am I," when an application uses the certificate to build a secure session token, and when an application uses private keys for digital signing of important data (e.g., transaction log) or for temporary data encryption.

Figure 4:
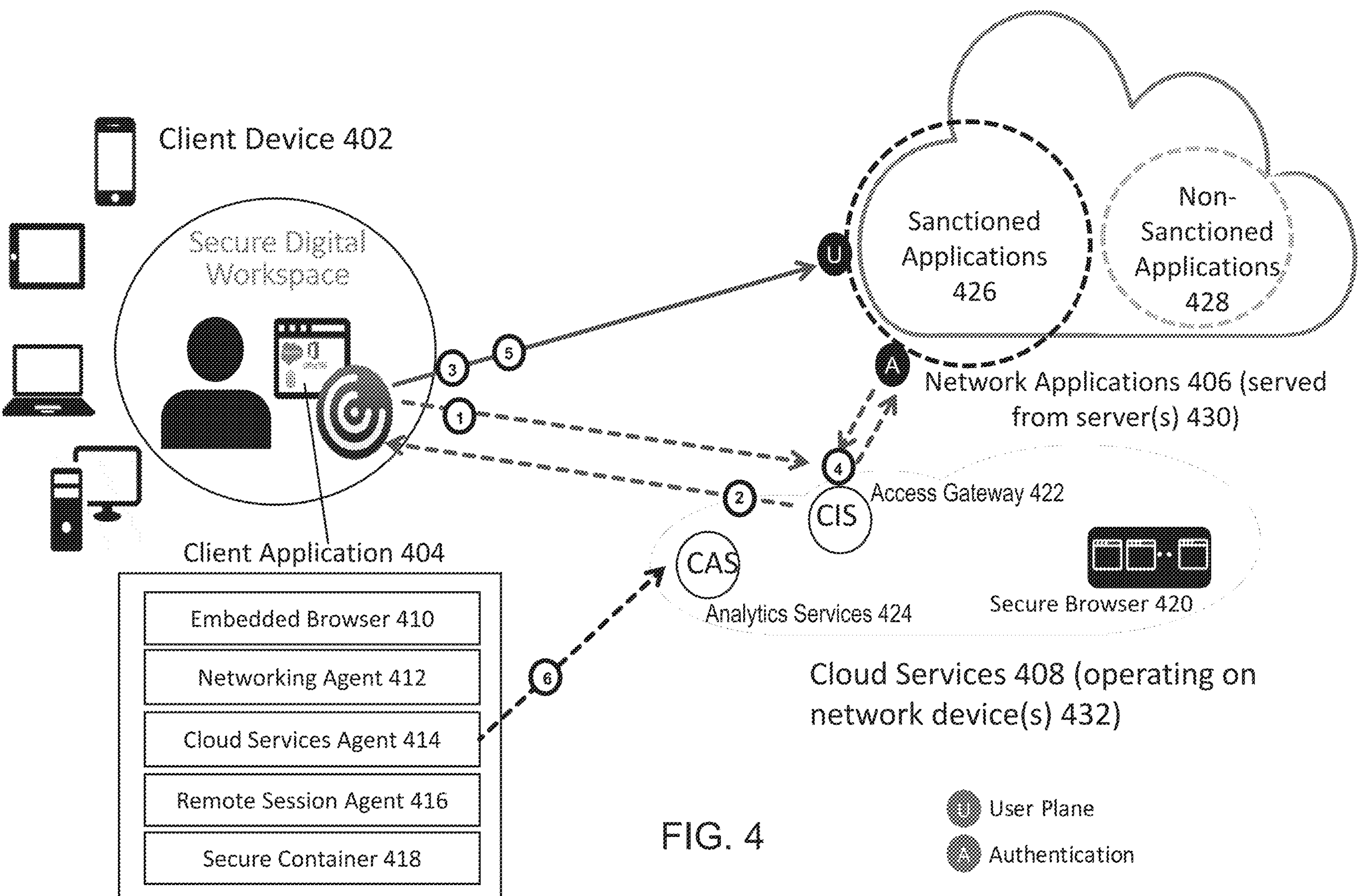
FIG. 4 is a block diagram of a system 400 of an embedded browser.

Referring now to FIG. 4, depicted is a block diagram of a system 400 of an embedded browser. In brief overview, the system 400 may include a client device 402 with a digital workspace for a user, a client application 404, cloud services 408 operating on at least one network device 432, and network applications 406 served from and/or hosted on one or more servers 430. The client application 404 can for instance include at least one of: an embedded browser 410, a networking agent 412, a cloud services agent 414, a remote session agent 416, or a secure container 418. The cloud services 408 can for instance include at least one of: secure browser(s) 420, an access gateway 422 (or CIS, e.g., for registering and/or authenticating the client application and/or user), or analytics services 424 (or CAS, e.g., for receiving information from the client application for analytics). The network applications 406 can include sanctioned applications 426 and non-sanctioned applications 428.

Each of the above-mentioned elements or entities is implemented in hardware, or a combination of hardware and software, in one or more embodiments. Each component of the system 400 may be implemented using hardware or a combination of hardware or software detailed above in connection with FIG. 1. For instance, each of these elements or entities can include any application, program, library, script, task, service, process or any type and form of executable instructions executing on hardware of the client device 402, the at least one network device 432 and/or the one or more servers 430. The hardware includes circuitry such as one or more processors in one or more embodiments. For example, the at least one network device 432 and/or the one or more servers 430 can include any of the elements of a computing device described above in connection with at least FIG. 1 for instance.

The client device 402 can include any embodiment of a computing device described above in connection with at least FIG. 1 for instance. The client device 402 can include any user device such as a desktop computer, a laptop computer, a tablet device, a smart phone, or any other mobile or personal device. The client device 402 can include a digital workspace of a user, which can include file system(s), cache or memory (e.g., including electronic clipboard(s)), container(s), application(s) and/or other resources on the client device 402. The digital workspace can include or extend to one or more networks accessible by the client device 402, such as an intranet and the Internet, including file system(s) and/or other resources accessible via the one or more networks. A portion of the digital workspace can be secured via the use of the client application 404 with embedded browser 410 (CEB) for instance. The secure portion of the digital workspace can include for instance file system(s), cache or memory (e.g., including electronic clipboard(s)), application(s), container(s) and/or other resources allocated to the CEB, and/or allocated by the CEB to network application(s) 406 accessed via the CEB. The secure portion of the digital workspace can also include resources specified by the CEB (via one or more policies) for inclusion in the secure portion of the digital workspace (e.g., a particular local application can be specified via a policy to be allowed to receive data obtained from a network application).

The client application 404 can include one or more components, such as an embedded browser 410, a networking agent 412, a cloud services agent 414 (sometimes referred to as management agent), a remote session agent 416 (sometimes referred to as HDX engine), and/or a secure container 418 (sometimes referred to as secure cache container). One or more of the components can be installed as part of a software build or release of the client application 404 or CEB, or separately acquired or downloaded and installed/integrated into an existing installation of the client application 404 or CEB for instance. For instance, the client device may download or otherwise receive the client application 404 (or any component) from the network device(s) 432. In some embodiments, the client device may send a request for the client application 404 to the network device (s) 432. For example, a user of the client device can initiate a request, download and/or installation of the client application. The network device(s) 432 in turn may send the client application to the client device. In some embodiments, the network device(s) 432 may send a setup or installation application for the client application to the client device. Upon receipt, the client device may install the client application onto a hard disk of the client device. In some embodiments, the client device may run the setup application to unpack or decompress a package of the client application. In some embodiments, the client application may be an extension (e.g., an add-on, an add-in, an applet or a plug-in) to another application (e.g., a networking agent 412) installed on the client device. The client device may install the client application to interface or inter-operate with the pre-installed application. In some embodiments, the client application may be a standalone application. The client device may install the client application to execute as a separate process.

The embedded browser 410 can include elements and functionalities of a web browser application or engine. The embedded browser 410 can locally render network application(s) as a component or extension of the client application. For instance, the embedded browser 410 can render a SaaS/Web application inside the CEB which can provide the CEB with full visibility and control of the application session. The embedded browser can be embedded or incorporated into the client application via any means, such as direct integration (e.g., programming language or script insertion) into the executable code of the client application, or via plugin installation. For example, the embedded browser can include a Chromium based browser engine or other type of browser engine, that can be embedded into the client application, using the Chromium embedded framework (CEF) for instance. The embedded browser can include a HTML5-based layout graphical user interface (GUI). The embedded browser can provide HTML rendering and JavaScript support to a client application incorporating various programming languages. For example, elements of the embedded browser can bind to a client application incorporating C, C++, Delphi, Go, Java, .NET/Mono, Visual Basic 6.0, and/or Python.

In some embodiments, the embedded browser comprises a plug-in installed on the client application. For example, the plug-in can include one or more components. One such components can be an ActiveX control or Java control or any other type and/or form of executable instructions capable of loading into and executing in the client application. For example, the client application can load and run an Active X control of the embedded browser, such as in a memory space or context of the client application. In some embodiments, the embedded browser can be installed as an extension on the client application, and a user can choose to enable or disable the plugin or extension. The embedded browser (e.g., via the plugin or extension) can form or operate as a secured browser for securing, using and/or accessing resources within the secured portion of the digital workspace.

The embedded browser can incorporate code and functionalities beyond that available or possible in a standard or typical browser. For instance, the embedded browser can bind with or be assigned with a secured container 418, to define at least part of the secured portion of a user's digital workspace. The embedded browser can bind with or be assigned with a portion of the client device's cache to form a secured clipboard (e.g., local to the client device, or extendable to other devices), that can be at least part of the secured container 418. The embedded browser can be integrated with the client application to ensure that traffic related to network applications is routed through and/or processed in the client application, which can provide the client application with real-time visibility to the traffic (e.g., when decrypted through the client application). This visibility to the traffic can allow the client application to perform or facilitate policy-based management (e.g., including data loss prevention (DLP) capabilities), application control, and collection and production of analytics.

In some embodiments, the embedded browser incorporates one or more other components of the client application 404, such as the cloud services agent 414, remote session agent 416 and/or secure container 418. For instance, a user can use the cloud services agent 414 of the embedded browser to interoperate with the access gateway 422 (sometimes referred to as CIS) to access a network application. For example, the cloud services agent 414 can execute within the embedded browser, and can receive and transmit navigation commands from the embedded browser to a hosted network application. The cloud services agent can use a remote presentation protocol to display the output generated by the network application to the embedded browser. For example, the cloud services agent 414 can include a HTML5 web client that allows end users to access remote desktops and/or applications on the embedded browser.

The client application 404 and CEB operate on the application layer of the operational (OSI) stack of the client device. The client application 404 can include and/or execute one or more agents that interoperate with the cloud services 408. The client application 404 can receive, obtain, retrieve or otherwise access various policies (e.g., an enterprise's custom, specified or internal policies or rules) and/or data (e.g., from an access gateway 422 and/or network device(s) of cloud services 408, or other server(s), that may be managed by the enterprise). The client application can access the policies and/or data to control and/or manage a network application (e.g., a SaaS, web or remote-hosted application). Control and/or management of a network application can include control and/or management of various aspects of the network application, such as access control, session delivery, available features or functions, service level, traffic management and monitoring, and so on. The network application can be from a provider or vendor of the enterprise (e.g., salesforce.com, SAP, Microsoft Office 365), from the enterprise itself, or from another entity (e.g., Dropbox or Gmail service).

For example, the cloud services agent 414 can provide policy driven management capabilities and features related to the use and/or access of network applications. For example, the cloud services agent 414 can include a policy engine to apply one or more policies (e.g., received from cloud services) to determine access control and/or connectivity to resources such as network applications. When a session is established between the client application and a server 430 providing a SaaS application for instance, the cloud services agent 414 can apply one or more policies to control traffic levels and/or traffic types (or other aspects) of the session, for instance to manage a service level of the SaaS application. Additional aspects of the application traffic that can be controlled or managed can include encryption level and/or encryption type applied to the traffic, level of interactivity allowed for a user, limited access to certain features of the network application (e.g., print-screen, save, edit or copy functions), restrictions to use or transfer of data obtained from the network application, limit concurrent access to two or more network applications, limit access to certain file repositories or other resources, and so on.

The cloud services agent 414 can convey or feed information to analytics services 424 of the cloud services 408, such as information about SaaS interaction events visible to the CEB. Such a configuration using the CEB can monitor or capture information for analytics without having an inline device or proxy located between the client device and the server(s) 430, or using a SaaS API gateway 'out-of-band' approach. In some embodiments, the cloud services agent 414 does not execute within the embedded browser. In these embodiments, a user can similarly use the cloud services agent 414 to interoperate with the access gateway (or CIS) 422 to access a network application. For instance, the cloud services agent 414 can register and/or authenticate with the access gateway (or CIS) 422, and can obtain a list of the network applications from the access gateway (or CIS) 422. The cloud services agent 414 can include and/or operate as an application store (or storefront) for user selection and/or downloading of network applications. Upon logging in to access a network application, the cloud services agent 414 can intercept and transmit navigation commands from the embedded browser to the network application. The cloud services agent can use a remote presentation protocol to display the output generated by the network application to the embedded browser. For example, the cloud services agent 414 can include a HTML5 web client that allows end users to access remote desktops and/or applications on the embedded browser.

In some embodiments, the cloud services agent 414 provides single sign on (SSO) capability for the user and/or client device to access a plurality of network applications. The cloud services agent 414 can perform user authentication to access network applications as well as other network resources and services, by communicating with the access gateway 422 for instance. For example, the cloud services agent 414 can authenticate or register with the access gateway 422, to access other components of the cloud services 408 and/or the network applications 406. Responsive to the authentication or registration, the access gateway 422 can perform authentication and/or SSO for (or on behalf of) the user and/or client application, with the network applications.

The client application 404 can include a networking agent 412. The networking agent 412 is sometimes referred to as a software-defined wide area network (SD-WAN) agent, mVPN agent, or microVPN agent. The networking agent 412 can establish or facilitate establishment of a network connection between the client application and one or more resources (e.g., server 430 serving a network application). The networking agent 412 can perform handshaking for a requested connection from the client application to access a network application, and can establish the requested connection (e.g., secure or encrypted connection). The networking agent 412 can connect to enterprise resources (including services) for instance via a virtual private network (VPN). For example, the networking agent 412 can establish a secure socket layer (SSL) VPN between the client application and a server 430 providing the network application 406. The VPN connections, sometimes referred to as microVPN or application-specific VPN, may be specific to particular network applications, particular devices, particular secured areas on the client device, and the like, for instance as discussed above in connection with FIG. 3. Such VPN connections can carry Microsoft Exchange traffic, Microsoft Active Directory traffic, HyperText Transfer Protocol (HTTP) traffic, HyperText Transfer Protocol Secure (HTTPS) traffic, as some examples.

The remote session agent 416 (sometimes referred to as HDX engine) can include features of the client agent 304 discussed above in connection with FIG. 2 for instance, to support display a remoting protocol (e.g., HDX or ICA). In some embodiments, the remote session agent 416 can establish a remote desktop session and/or remote application session in accordance to any variety of protocols, such as the Remote Desktop Protocol (RDP), Appliance Link Protocol (ALP), Remote Frame Buffer (RFB) Protocol, and ICA Protocol. For example, the remote session agent 416 can establish a remote application session for a user of the client device to access an enterprise network application. The remote session agent 416 can establish the remote application session within or over a secure connection (e.g., a VPN) established by the networking agent 412 for instance.

The client application or CEB can include or be associated with a secure container 418. A secure container can include a logical or virtual delineation of one or more types of resources accessible within the client device and/or accessible by the client device. For example, the secure container 418 can refer to the entirety of the secured portion of the digital workspace, or particular aspect(s) of the secured portion. In some embodiments, the secure container 418 corresponds to a secure cache (e.g., electronic or virtual clipboard), and can dynamically incorporate a portion of a local cache of each client device of a user, and/or a cloud-based cache of the user, that is protected or secured (e.g., encrypted). The secure container can define a portion of file system(s), and/or delineate resources allocated to a CEB and/or to network applications accessed via the CEB. The secure container can include elements of the secure data container 228 discussed above in connection with FIG. 2 for example. The CEB can be configured (e.g., via policies) to limit, disallow or disable certain actions or activities on resources and/or data identified to be within a secure container. A secured container can be defined to specify that the resources and/or data within the secure container are to be monitored for misuse, abuse and/or exfiltration.

In certain embodiments, a secure container relates to or involves the use of a secure browser (e.g., embedded browser 410 or secure browser 420) that implements various enterprise security features. Network applications (or web pages accessed by the secure browser) that are configured to run within the secure browser can effectively inherit the security mechanisms implemented by the secure browser. These network applications can be considered to be contained within the secure container. The use of such a secure browser can enable an enterprise to implement a content filtering policy in which, for example, employees are blocked from accessing certain web sites from their client devices. The secure browser can be used, for example, to enable client device users to access a corporate intranet without the need for a VPN.

In some embodiments, a secure container can support various types of remedial actions for protecting enterprise resources. One such remedy is to lock the client device, or a secure container on the client device that stores data to be protected, such that the client device or secure container can only be unlocked with a valid code provided by an administrator for instance. In some embodiments, these and other types of remedies can be invoked automatically based on conditions detected on the client device (via the application of policies for instance), or can be remotely initiated by an administrator.

In some embodiments, a secure container can include a secure document container for documents. A document can comprise any computer-readable file including text, audio, video, and/or other types of information or media. A document can comprise any single one or combination of these media types. As explained herein, the secure container can help prevent the spread of enterprise information to different applications and components of the client device, as well as to other devices. The enterprise system (which can be partially or entirely within a cloud network) can transmit documents to various devices, which can be stored within the secure container. The secure container can prevent unauthorized applications and other components of the client device from accessing information within the secure container. For enterprises that allow users to use their own client devices for accessing, storing, and using enterprise data, providing secure container on the client devices helps to secure the enterprise data. For instance, providing secure containers on the client devices can centralize enterprise data in one location on each client device, and can facilitate selective or complete deletion of enterprise data from each client device when desired.

The secure container can include an application that implements a file system that stores documents and/or other types of files. The file system can comprise a portion of a computer-readable memory of the client device. The file system can be logically separated from other portions of the computer-readable memory of the client device. In this way, enterprise data can be stored in a secure container and private data can be stored in a separate portion of the computer-readable memory of the client device for instance. The secure container can allow the CEB, network applications accessed via the CEB, locally installed applications and/or other components of the client device to read from, write to, and/or delete information from the file system (if authorized to do so). Deleting data from the secure container can include deleting actual data stored in the secure container, deleting pointers to data stored in the secure container, deleting encryption keys used to decrypt data stored in the secure container, and the like. The secure container can be installed by, e.g., the client application, an administrator, or the client device manufacturer. The secure container can enable some or all of the enterprise data stored in the file system to be deleted without modifying private data stored on the client device outside of the secure container. The file system can facilitate selective or complete deletion of data from the file system. For example, an authorized component of the enterprise's system can delete data from the file system based on, e.g., encoded rules. In some embodiments, the client application can delete the data from the file system, in response to receiving a deletion command from the enterprise's system.

The secure container can include an access manager that governs access to the file system by applications and other components of the client device. Access to the file system can be governed based on document access policies (e.g., encoded rules) maintained by the client application, in the documents and/or in the file system. A document access policy can limit access to the file system based on (1) which application or other component of the client device is requesting access, (2) which documents are being requested, (3) time or date, (4) geographical position of the client device, (5) whether the requesting application or other component provides a correct certificate or credentials, (6) whether the user of the client device provides correct credentials, (7) other conditions, or any combination thereof. A user's credentials can comprise, for example, a password, one or more answers to security questions (e.g., What is the mascot of your high school?), biometric information (e.g., fingerprint scan, eye-scan), and the like. Hence, by using the access manager, the secure container can be configured to be accessed only by applications that are authorized to access the secure container. As one example, the access manager can enable enterprise applications installed on the client device to access data stored in the secure container and to prevent non-enterprise applications from accessing the data stored in the secure container.

Temporal and geographic restrictions on document access may be useful. For example, an administrator may deploy a document access policy that restricts the availability of the documents (stored within the secure container) to a specified time window and/or a geographic zone (e.g., as determined by a GPS chip) within which the client device must reside in order to access the documents. Further, the document access policy can instruct the secure container or client application to delete the documents from the secure container or otherwise make them unavailable when the specified time period expires or if the client device is taken outside of the defined geographic zone.

Some documents can have access policies that forbid the document from being saved within the secure container. In such embodiments, the document can be available for viewing on the client device only when the user is logged in or authenticated via the cloud services for example.

The access manager can also be configured to enforce certain modes of connectivity between remote devices (e.g., an enterprise resource or other enterprise server) and the secure container. For example, the access manager can require that documents received by the secure container from a remote device and/or sent from the secure container to the remote device be transmitted through secured tunnels/connections, for example. The access manager can require that all documents transmitted to and from the secure container be encrypted. The client application or access manager can be configured to encrypt documents sent from the secure container and decrypt documents sent to the secure container. Documents in the secure container can also be stored in an encrypted form.

The secure container can be configured to prevent documents or data included within documents or the secure container from being used by unauthorized applications or components of the client device or other devices. For instance, a client device application having authorization to access documents from the secure container can be programmed to prevent a user from copying a document's data and pasting it into another file or application interface, or locally saving the document or document data as a new file outside of the secure container. Similarly, the secure container can include a document viewer and/or editor that do not permit such copy/paste and local save operations. Moreover, the access manager can be configured to prevent such copy/paste and local save operations. Further, the secure container and applications programmed and authorized to access documents from the secure container can be configured to prevent users from attaching such documents to emails or other forms of communication.

One or more applications (e.g., applications installed on the client device, and/or network applications accessed via the CEB) can be programmed or controlled (e.g., via policy-based enforcement) to write enterprise-related data only into the secure container. For instance, an application's source code can be provided with the resource name of the secure container. Similarly, a remote application (e.g., executing on a device other than the client device) can be configured to send data or documents only to the secure container (as opposed to other components or memory locations of the client device). Storing data to the secure container can occur automatically, for example, under control of the application, the client application, and/or the secure browser. The client application can be programmed to encrypt or decrypt documents stored or to be stored within the secure container. In certain embodiments, the secure container can only be used by applications (on the client device or a remote device) that are programmed to identify and use the secure container, and which have authorization to do so.

The network applications 406 can include sanctioned network applications 426 and non-sanctioned network applications 428. By way of a non-limiting example, sanctioned network applications 426 can include network applications from Workday, Salesforce, Office 365, SAP, and so on, while non-sanctioned network applications 426 can include network applications from Dropbox, Gmail, and so on. For instance, FIG. 4 illustrates a case where sanctioned applications 426 are accessed via a CEB. In operation (1), a user instance of a client application 404, that is installed on client device 402, can register or authenticate with the access gateway 422 of cloud services 408. For example, the user can authenticate the user to the client device and login to the client device 402. The client application can automatically execute, or be activated by the user. In some embodiments, the user can sign in to the client application (e.g., by authenticating the user to the client application). In response to the login or sign-in, the client application can register or authenticate the user and/or the client application with the access gateway 422.

In operation (2), in response to the registration or authentication, the access gateway 422 can identify or retrieve a list of enumerated network applications available or pre-assigned to the user, and can provide the list to the client application. For example, in response to the registration or authentication, the access gateway can identify the user and/or retrieve a user profile of the user. According to the identity and/or user profile, the access gateway can determine the list (e.g., retrieve a stored list of network applications matched with the user profile and/or the identity of the user). The list can correspond to a list of network applications sanctioned for the user. The access gateway can send the list to the client application or embedded browser, which can be presented via the client application or embedded browser to the user (e.g., in a storefront user interface) for selection.

In operation (3), the user can initiate connection to a sanctioned network application (e.g., a SaaS application), by selecting from the list of network applications presented to the user. For example, the user can click on an icon or other representation of the sanctioned network application, displayed via the client application or embedded browser. This user action can trigger the CEB to transmit a connection or access request to a server that provisions the network application. The request can include a request to the server (e.g., SaaS provider) to communicate with the access gateway to authenticate the user. The server can send a request to the access gateway to authenticate the user for example.

In operation (4), the access gateway can perform SSO with the server, to authenticate the user. For example, in response to the server's request to authenticate the user, the access gateway can provide credentials of the user to the server(s) 430 for SSO, to access the selected network application and/or other sanctioned network applications. In operation (5), the user can log into the selected network application, based on the SSO (e.g., using the credentials). The client application (e.g., the networking agent 412 and/or the remote session agent 416) can establish a secure connection and session with the server(s) 430 to access the selected network application. The CEB can decrypt application traffic received via the secure connection. The CEB can monitor traffic sent via the CEB and the secured connection to the servers 430.

In operation (6), the client application can provide information to the analytics services 424 of cloud services 408, for analytics processing. For example, the cloud services agent 414 of the client application 404 can monitor for or capture user interaction events with the selected network application. The cloud services agent 414 can convey the user interaction events to the analytics services 424, to be processed to produce analytics.

Figure 5:
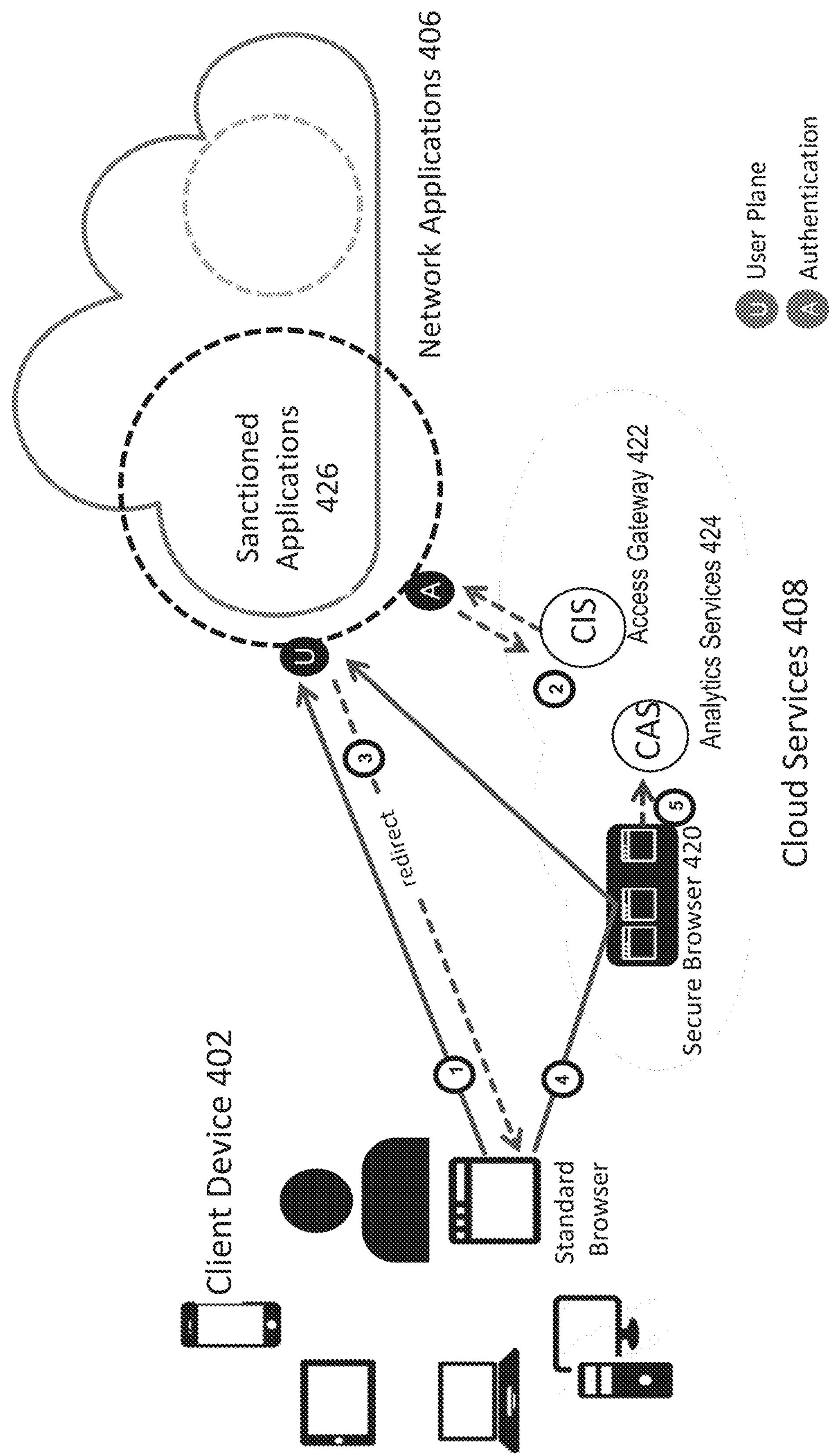
FIG. 5 is a block diagram of an example embodiment of a system for using a secure browser.

FIG. 5 depicts an example embodiment of a system for using a secure browser. In brief overview, the system includes cloud services 408, network applications 406 and client device 402. In some embodiments, various elements of the system are similar to that described above for FIG. 4, but that the client application (with embedded browser) is not available in the client device 402. A standard or typical browser may be available on the client device, from which a user can initiate a request to access a sanctioned network application for instance. A network application can be specified as being sanctioned or unsanctioned via policies that can be set by an administrator or automatically (e.g., via artificial intelligence).

For example, in operation (1), the user may log into the network application using the standard browser. For accessing a sanctioned network application, the user may access a predefined URL and/or corresponding webpage of a server that provisions the network application, via the standard browser, to initiate a request to access the network application. In some embodiments, the request can be forwarded to or intercepted by a designated gateway service (e.g., in a data path of the request). For example, the gateway service can reside on the client device (e.g., as an executable program), or can reside on a network device 432 of the cloud services 408 for instance. In some embodiments, the access gateway can correspond to or include the gateway service. The gateway service can determine if the requested network application is a sanctioned network application. The gateway service can determine if a CEB initiated the request. The gateway service can detect or otherwise determine that the request is initiated from a source (e.g., initiated by the standard browser) in the client device other than a CEB. In some embodiments, there is no requirement for a designated gateway service to detect or determine if the request is initiated from a CEB, for example if the requested network application is sanctioned, that user is initiating the request via a standard browser, and/or that the predefined URL and/or corresponding webpage is accessed.

In operation (2), the server may authenticate the user via the access gateway of the cloud services 408. The server may communicate with the access gateway to authenticate the user, in response to the request. For instance, the request can include an indication to the server to communicate with the access gateway to authenticate the user. In some embodiments, the server is pre-configured to communicate with the access gateway to authenticate the user, for requests to access a sanctioned network application. The server may send a request to the access gateway to authenticate the user. In response to the server's request to authenticate the user, the access gateway can provide credentials of the user to the server 430.

In operation (3), the gateway service and/or the server can direct (or redirect) all traffic to a secure browser 420 which provides a secure browsing service. This may be in response to at least one of: a determination that the requested network application is a sanctioned network application, a determination that the request is initiated from a source other than a CEB, a determination that the requested network application is sanctioned, a determination that user is initiating the request via a standard browser, and/or a determination that the predefined URL and/or corresponding webpage is accessed.

The user's URL session can be redirected to the secure browser. For example, the server, gateway service and/or the access gateway can generate and/or send a URL redirect message to the standard browser, responsive to the determination. The secure browser plug-in of the standard browser can receive the URL redirect message, and can for example send a request to access the non-sanctioned network application, to the secure browser 420. The secure browser 420 can direct the request to the server of the non-sanctioned network application. The URL redirect message can instruct the standard browser (and/or the secure browser plug-in) to direct traffic (e.g., destined for the network application) from the standard browser to the secure browser 420 hosted on a network device. This can provide clientless access and control via dynamic routing though a secure browser service. In some embodiments, a redirection of all traffic to the secure browser 420 is initiated or configured, prior to performing authentication of the user (e.g., using SSO) with the server.

In some embodiments, the gateway service can direct or request the server of the requested network application to communicate with the secure browser 420. For example, the gateway service can direct the server and/or the secure browser to establish a secured connection between the server and the secure browser, for establishing an application session for the network application.

In some embodiments, the secured browser 420 comprises a browser that is hosted on a network device 432 of the cloud services 408. The secured browser 420 can include one or more features of the secured browser 420 described above in connection with at least FIG. 4 for instance. The hosted browser can include an embedded browser of a CEB that is hosted on the network device 432 instead of on the client device. The hosted browser can include an embedded browser of a hosted virtualized version of the CEB that is hosted on the network device 432. Similar to the CEB installed on the client device, traffic is routed through the CEB hosted on the network device, which allows an administrator to have visibility of the traffic through the CEB and to remain in control for security policy control, analytics, and/or management of performance.

Figure 6:
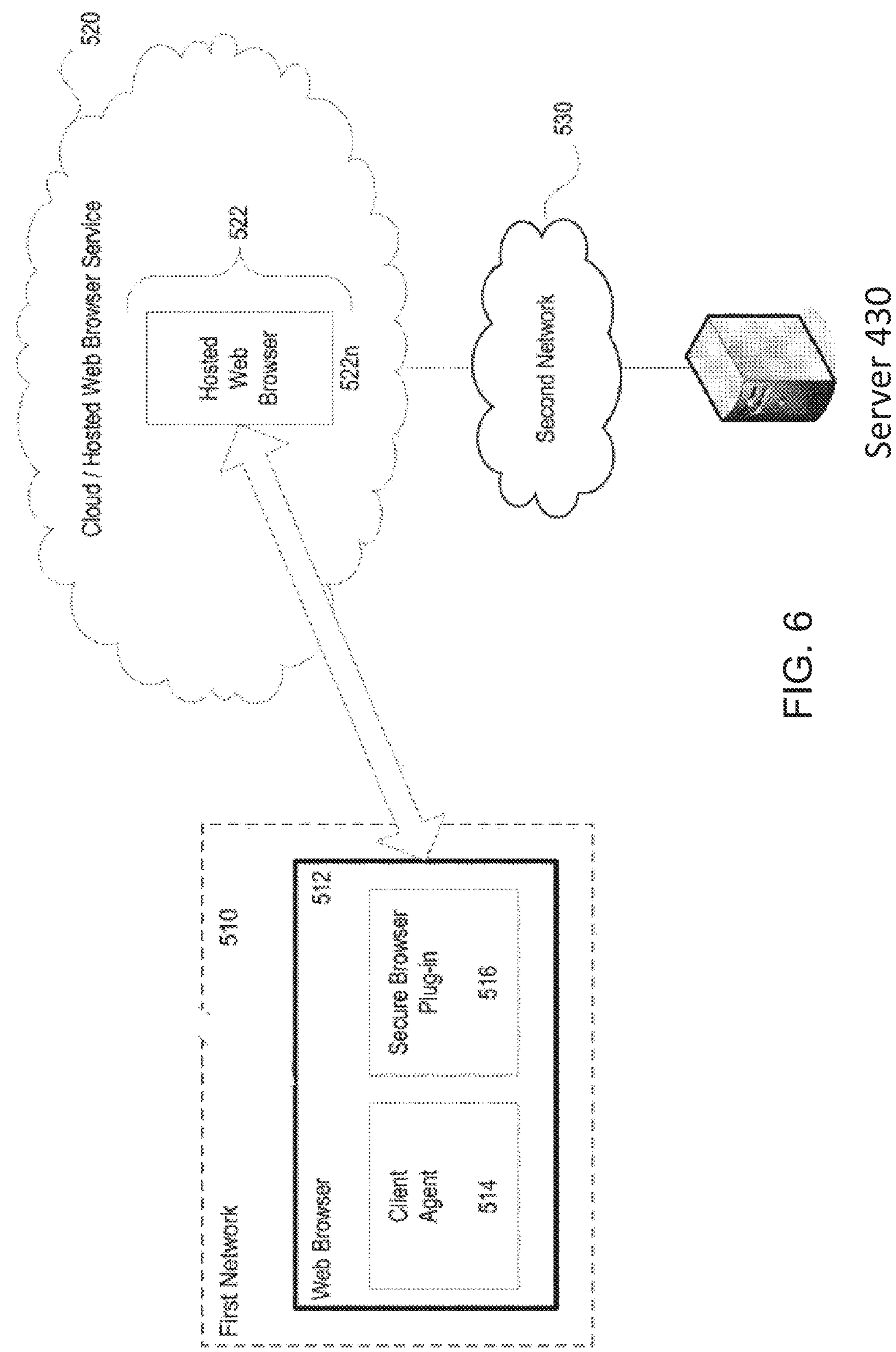

FIG. 6 illustrates an example implementation for browser redirection using a secure browser plug-in. In brief overview, the implementation includes a web browser 512 with a secure browser plug-in 516 operating on a client device, and a hosted web browser (or secure browser) 522 residing on a network device. The web browser 512 can correspond to a standard browser, instead of an embedded browser as discussed above in connection with FIG. 4 for example. The secure browser plug-in 516 can execute within a first network 510 and access a server 430 in a second network 530. The first network 510 and the second network 530 are for illustration purposes and may be replaced with fewer or additional computer networks. A secure browser plug-in 516 can be installed on the standard browser 512. The plug-in can include one or more components. One such component can include an ActiveX control or Java control or any other type and/or form of executable instructions capable of loading into and executing in the standard browser. For example, the standard browser can load and run an Active X control of the secure browser plug-in 516, in a memory space or context of the standard browser. In some embodiments, the secure browser plug-in can be installed as an extension on the standard browser, and a user can choose to enable or disable the plugin or extension. The secure browser plug-in can communicate and/or operate with the secured browser 420 for securing, using and/or accessing resources within the secured portion of the digital workspace.

By using the secure browser plug-in 516 operating within the standard browser 512 network applications accessed via the standard browser 512 can be redirected to a hosted secure browser. For instance, the secure browser plug-in 516 can be implemented and/or designed to detect that a network application is being accessed via the standard browser, and can direct/redirect traffic from the client device associated with the network application, to the hosted secure browser. The hosted secure browser can direct traffic received from the network application, to the secure browser plug-in 516 and/or a client agent 514 for rendering and/or display for example. The client agent 514 can execute within the web browser 512 and/or the secure browser plug-in, and can include certain elements or features of the client application 404 discussed above in connection with at least FIG. 4 for example. For instance, the client agent 514 can include a remote session agent 416 for rendering the network application at the web browser 512. In some embodiments, the network application is rendered at the hosted secure browser, and the rendered data is conveyed or mirrored to the secure browser plug-in 516 and/or the client agent 514 for processing and/or display.

By way of an example, a user may be working remotely and may want to access a network application that is internal to a secure corporate network while the user is working on a computing device connected to an unsecure network. In this case, the user may be utilizing the standard browser 512 executing in the first network 510, in which the first network 510 may comprise an unsecure network. The server 430 that the user wants to access may be on the second network 530, in which the second network 530 comprises a secure corporate network for instance. The user might not be able to access the server 430 from the unsecure first network 510 by clicking on an internal uniform record locator (URL) for the secure website 532. That is, the user may need to utilize a different URL (e.g., an external URL) while executing the standard browser 512 from the external unsecure network 510. The external URL may be directed to or may address one or more hosted web browsers 522 configured to access server(s) 430 within the second network 530 (e.g., secure network). To maintain secure access, the secure browser plug-in 516 may redirect an internal URL to an external URL for a hosted secure browser.

The secure browser plug-in 516 may be able to implement network detection in order to identify whether or not to redirect internal URLs to external URLs. The standard browser 512 may receive a request comprising an internal URL for a website executing within the secure network. For example, the standard browser 512 may receive the request in response to a user entering a web address (e.g., for secure website 532) in the standard browser. The secure browser plug-in 516 may redirect the user web browser application 512 from the internal URL to an external URL for a hosted web browser application. For example, the secure browser plug-in 516 may replace the internal URL with an external URL for the hosted web browser application 522 executing within the secure network 530.

The secure browser plug-in 516 may allow the client agent 514 to be connected to the hosted web browser application 522. The client agent 514 may comprise a plug-in component, such as an ActiveX control or Java control or any other type and/or form of executable instructions capable of loading into and executing in the standard browser 512. For example, the client agent 514 may comprise an ActiveX control loaded and run by a standard browser 512, such as in the memory space or context of the user web browser application 512. The client agent 514 may be pre-configured to present the content of the hosted web browser application 522 within the user web browser application 512.

The client agent 514 may connect to a server or the cloud/hosted web browser service 520 using a thin-client or remote-display protocol to present display output generated by the hosted web browser application 522 executing on the service 520. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

The hosted web browser application 522 may navigate to the requested network application in full-screen mode, and can render the requested network application. The client agent 514 may present the content or rendition of the network application on the web browser application 512 in a seamless and transparent manner such that it appears that the content is being displayed by the standard browser 512, e.g., based on the content being displayed in full screen mode. In other words, the user may be given the impression that the website content is displayed by the user web browser application 512 and not by the hosted web browser application 522. The client agent 514 may transmit navigation commands generated by the user web browser application 512 to the hosted web browser application 522 using the thin-client or remote-display protocol. Changes to the display output of the hosted web browser application 522, due to the navigation commands, may be reflected in the user web browser application 512 by the client agent 514, giving the impression to the user that the navigation commands were executed by the user web browser application 512.

Referring again to FIG. 5, and in operation (4), a new browser tab can open on the standard browser, to render or display the secure browser session. The new browser tab can be established or opened by the secure browser plug-in for instance. The secure browser plug-in and/or a client agent can receive data from the secure browser session, and can render the network application within the new browser tab as discussed above in connection with FIG. 6 for instance.

In operation (5), the secure browser can feed all user interaction events via the network application, back to analytics service for processing. The secure browser plug-in can monitor for and intercept any user interaction events directed to the rendition of the network application within the browser tab. Hence, a user can use a native (or standard) browser to access a network application while allowing visibility into the network application's traffic, via the interoperation of cloud services and a secure browser (in the absence of the client application).

Figure 7:
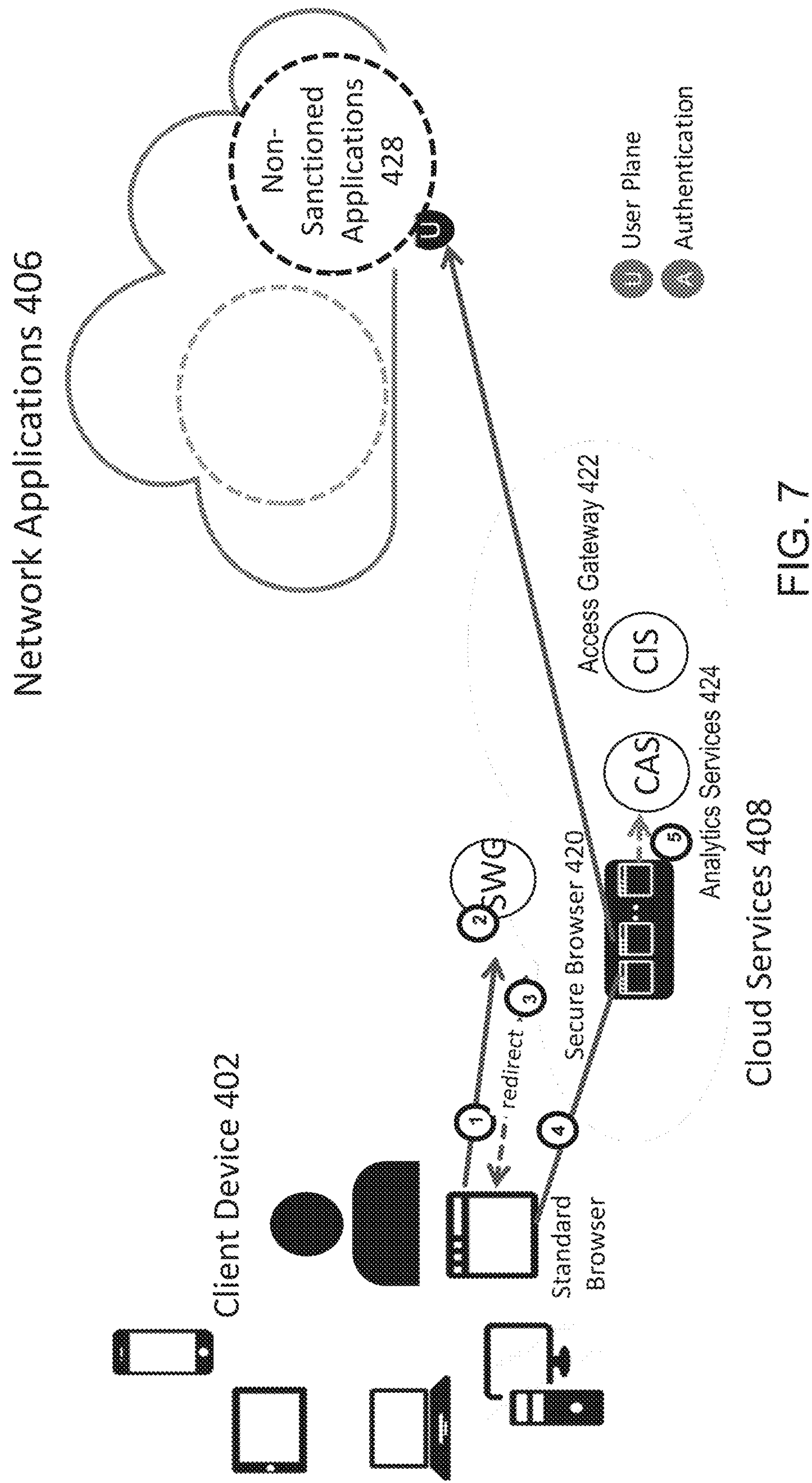
FIG. 7 is a block diagram of example embodiment of a system of using a secure browser.

FIG. 7 depicts another example embodiment of a system of using a secure browser. In brief overview, the system includes cloud services 408, network applications 406 and the client device 402. In some embodiments, various elements of the system are similar to that described above for FIG. 5. A client application with embedded browser is not available in the client device 402. A standard or typical (e.g., HTML5) browser is available on the client device, from which a user can initiate a request to access a non-sanctioned network application. A network application can be specified as being sanctioned or non-sanctioned via policies that can be set by an administrator or automatically (e.g., via artificial intelligence).

In operation (1), the user may attempt to log into a non-sanctioned network application using the standard browser. The user may attempt to access a webpage of a server that provisions the network application, and to initiate a request to access the network application. In some embodiments, the request can be forwarded to or intercepted by a designated gateway service (e.g., in a data path of the request). For example, the gateway service (sometimes referred to as SWG) can reside on the client device (e.g., as an executable program), or can reside on a network device 432 of the cloud services 408 for instance. The gateway service can detect or otherwise determine if the requested network application is a sanctioned network application. The gateway service can determine if a CEB initiated the request. The gateway service can detect or otherwise determine that the request is initiated from a source (e.g., initiated by the standard browser) in the client device other than a CEB.

In operation (2), the gateway service detects that the requested network application is a non-sanctioned network application. The gateway service can for instance extract information from the request (e.g., destination address, name of the requested network application), and compare the information against that from a database of sanctioned and/or non-sanctioned network applications. The gateway service can determine, based on the comparison, that the requested network application is a non-sanctioned network application.

In operation (3), responsive to the determination, the gateway service can block access to the requested network application, e.g., by blocking the request. The gateway service can generate and/or send a URL redirect message to the standard browser, responsive to the determination. The URL redirect message can be similar to a URL redirect message sent from the server to the standard browser in FIG. 5 in operation (3). A secure browser plug-in of the standard browser can receive the URL redirect message, and can for example send a request to access the non-sanctioned network application, to the secure browser 420. The secure browser 420 can direct the request to the server of the non-sanctioned network application.

The server of the non-sanctioned network application may authenticate the user via the access gateway of the cloud services 408, e.g., responsive to receiving the request from the secure browser. The server may communicate with the access gateway to authenticate the user, in response to the request. The server may send a request to the access gateway to authenticate the user. In response to the server's request to authenticate the user, the access gateway can provide credentials of the user to the server 430. Upon authentication, the secure browser (or a corresponding CEB) can establish a secured connection and an application session with the server.

In operation (4), a new browser tab can open on the standard browser, to render or display the secure browser's application session. The new browser tab can be established or opened by the secure browser plug-in for instance. The secure browser plug-in and/or a client agent can receive data from the secure browser session, and can render the network application within the new browser tab as discussed above in connection with FIGS. 5-6 for instance.

In operation (5), the secure browser can feed all user interaction events via the network application, back to analytics service for processing. The secure browser plug-in can monitor for and intercept any user interaction events directed to the rendition of the network application within the browser tab. Hence, a user can use a native (or standard) browser to access a network application while allowing visibility into the network application's traffic, via the interoperation of cloud services and a secure browser (in the absence of the client application).

In some embodiments, in the absence or non-availability of a CEB on the client device, browser redirection is performed so that each requested network application is accessed via a corresponding hosted secure browser (or hosted CEB) for handling, instead of having all traffic redirected through a single hosted secure browser (or hosted CEB). Each dedicated secure browser can provide compartmentalization and improved security.

The use of a CEB, whether hosted or local to the client device, can allow for end-to-end visibility of application traffic for analytics, service level agreement (SLA), resource utilization, audit, and so on. In addition to such visibility, the CEB can be configured with policies for managing and controlling any of these as well as other aspects. For example, DLP features can be supported, to control "copy and paste" activities, download of files, sharing of files, and to implement watermarking for instance. As another example, the CEB can be configured with policies for managing and controlling access to local drives and/or device resources such as peripherals.

Figure 8:
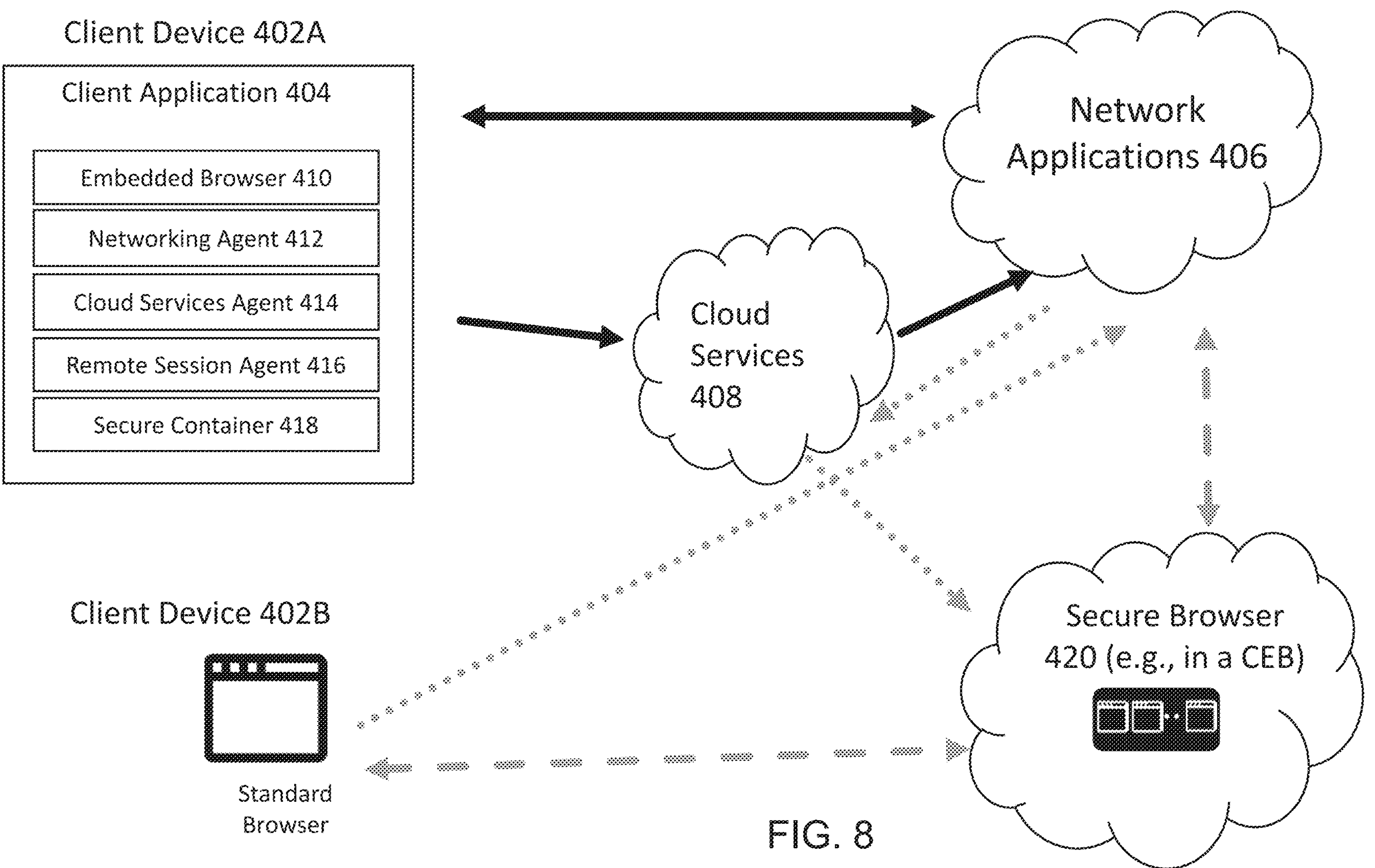
FIG. 8 is a block diagram of an example embodiment of a system for using local embedded browser(s) and hosted secured browser(s)

Referring now to FIG. 8, an example embodiment of a system for using local embedded browser(s) and hosted secured browser(s) is depicted. An environment is shown where different types of client devices 402A, 402B may be used (e.g., in a BYOD context), such that one may be locally equipped with a suitable CEB, and another client device may not have a suitable local CEB installed. In such an environment, systems described in FIGS. 4, 5 and 7 can be used to support each of the client devices based on the availability of a locally installed and suitable CEB.

Figure 9:
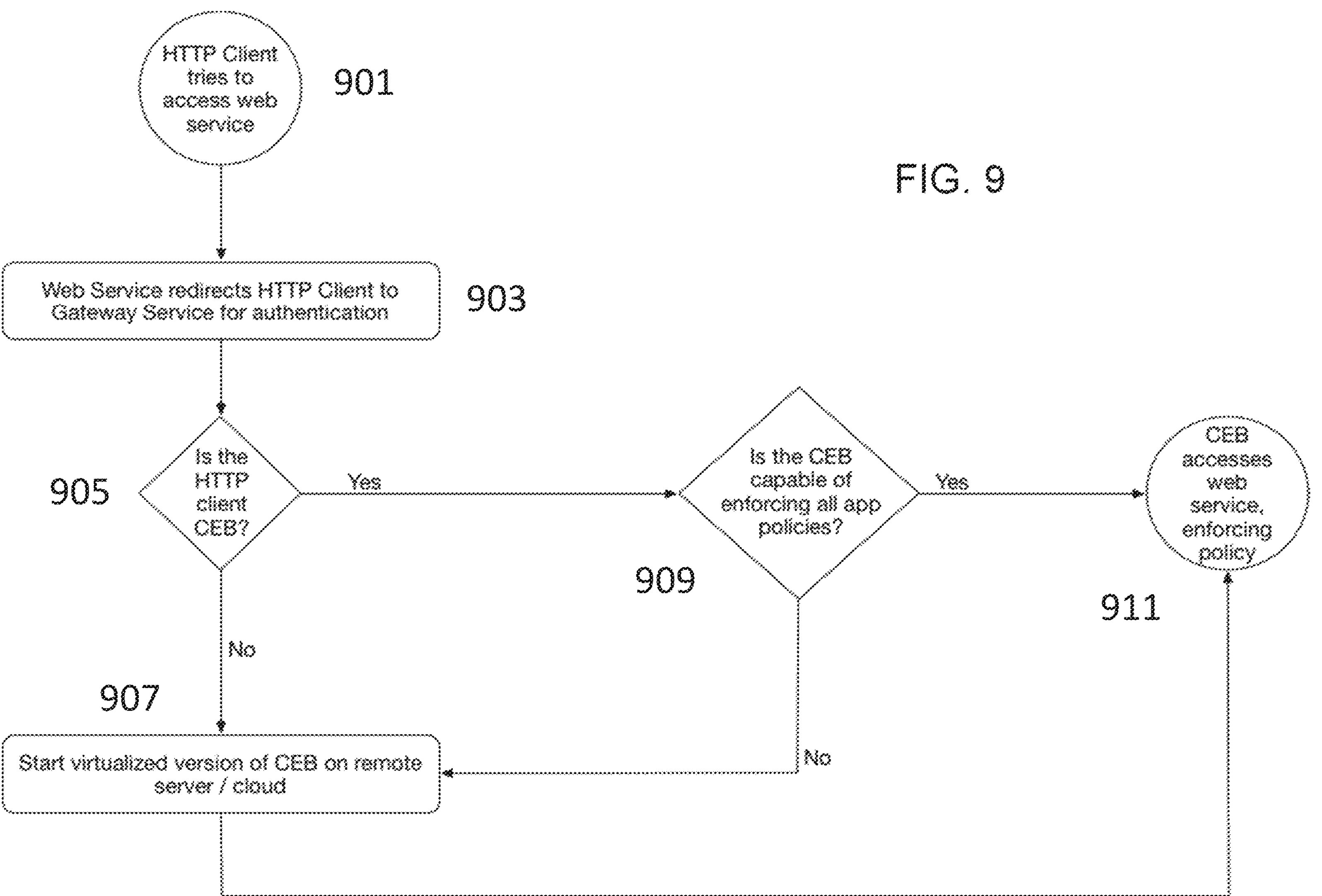
FIG. 9 is an example process flow for using local embedded browser(s) and hosted secured browser(s)

FIG. 9 depicts an example process flow for using local embedded browser(s) and hosted secured browser(s). The process flow can be used in the environment described above in FIG. 8, to determine whether an embedded browser or a hosted secured browser should be used for each client device to access a network application. For example, in operation 901, a HTTP client can attempt to access a web service (e.g., server of a network application). In operation 903, the web service can redirect the HTTP client to a gateway service for authentication. In operation 905, the gateway service can determine if the HTTP client is a CEB. If so, in operation 909, the gateway service can determine if the CEB is a suitable CEB, e.g., capable of enforcing defined application policies. If so, in operation 911, the CEB is allowed access to the web service, and can enforce the defined policies.

If the gateway service determines that the HTTP client is not a CEB, the gateway service can cause a virtualized version of a CEB to be initialized and hosted on a remote server (e.g., a network device 432 of cloud services 408), in operation 907. In some embodiments, such a hosted CEB may already be available on a network device 432, and can be selected for use. For example in operation 911, the CEB is allowed access to the web service, and can enforce the defined policies.

If the gateway service determines that the HTTP client is a CEB, but that the CEB is not a suitable CEB, the gateway service can cause a virtualized version of a CEB to be initialized and hosted on a remote server (e.g., a network device 432 of cloud services 408), in operation 907. In some embodiments, such a hosted CEB may already be available on a network device 432, and can be selected for use. For example in operation 911, the CEB is allowed access to the web service, and can enforce the defined policies.

In some embodiments, if the user is requesting access to a web application located in a company data center, the gateway service (in cloud service or on premise) can allow access when the client application with CEB is detected. Otherwise, the request can be routed to a service with the hosted virtualized version of the CEB, and then access is authenticated and granted.

At operation 905 and/or operation 909 for instance, the decisions made on whether the HTTP client is a CEB and whether it is a suitable CEB may be determined by a number of factors. For example, to determine if the HTTP client is CEB, the gateway service may take into account factors, for example including at least one of: user Identity and strength of authentication, client Location, client IP Address, how trusted the user identity, client location, client IP are, jailbreak status of the client device, status of anti-malware software, compliance to corporate policy of the client device, and/or remote attestation or other evidence of integrity of the client software.

To determine if the CEB is able to honor or support all defined application policies (which may vary by client version, client OS platform and other factors), the client device's software and gateway service may perform capability negotiation and/or exchange version information. In some embodiments, the gateway service can query or check a version number or identifier of the CEB to determine if the CEB is a suitable CEB to use.

Driving all the traffic though the CEB then allows additional control of content accessing SaaS and Web based systems. Data Loss Prevention (DLP) of SaaS and Web traffic can be applied through the CEB app with features including copy and paste control to other CEB access applications or IT managed devices. DLP can also be enforced by enabling content to be downloaded only to designated file servers or services under IT control.

Figure 10:
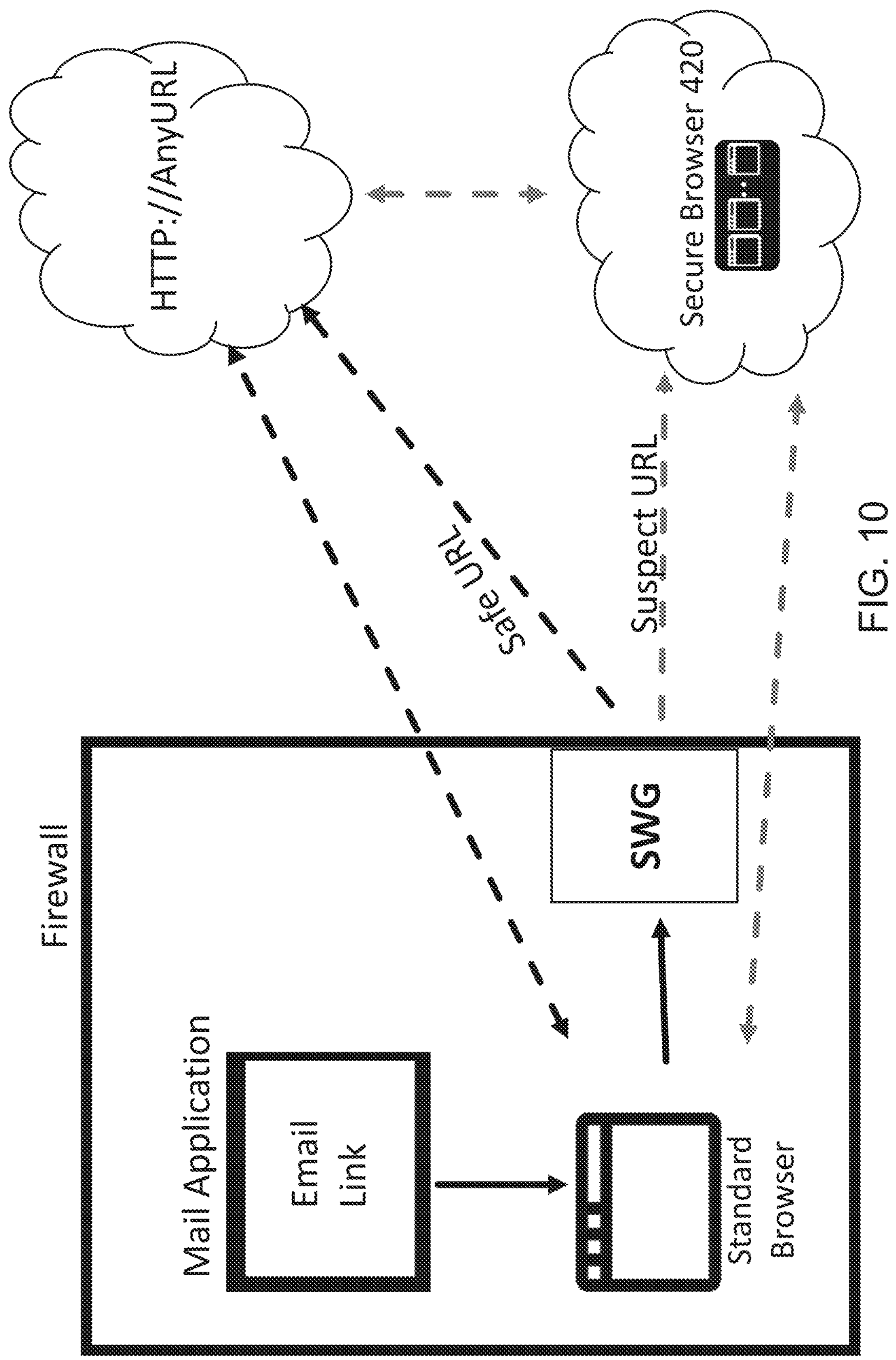
FIG. 10 is an example embodiment of a system for managing user access to webpages.

Referring now to FIG. 10, depicted is an example embodiment of a system for managing user access to webpages. Some webpages (or websites) are known to be safe while others may be suspect. A user may access a webpage via a corresponding URL through a standard browser. For example, the user may click on a link corresponding to the URL, which may be included in an email being viewed using a mail application. An access gateway (SWG) may intercept an access request generated by the clicking of the link, and can determine if the corresponding URL is safe or suspect. If the URL is known to be safe, the access gateway can allow the request to proceed to the corresponding website or web server. If the URL is suspect, the access gateway can redirect the request to be handled via a hosted secure browser. The secure browser can request access for, and access the webpage (on behalf of the standard browser), and can allow the webpage information to be conveyed to the standard browser, similar to the handling of a network application via browser redirection as discussed in connection with at least FIGS. 7 and 5.

C. Systems and Methods for Displaying Overlays for a Network Application

The present disclosure is directed towards systems and methods for displaying software-as-a-service (SaaS) overlays on a network application via an embedded browser on a client device. SaaS applications, also referred to as network applications, are not easily customizable by the enterprise and such customizations require large costs to be paid to software consultants. For instance, customizing Salesforce or SAP can be a huge cost for the enterprise. Furthermore, the workflow of SaaS applications can be complex causing users to need training on usage. This training can decrease user productivity and cost the organization. In addition, SaaS applications can be monotonous which decreases user engagement.

To address the previously mentioned concerns, an embedded browser within a client application on a client device can be leveraged to display or present overlay content on top of a network application running within the embedded browser. The overlay content may provide the user with training videos, tutorials, social options (e.g., emoticons, likes), form help text, form autofill suggestions, or navigation assistance. Once the overlay content is presented, feedback can be received in order to modify the subsequent overlays.

In some embodiments, the overlay customization on the network application can address some of the problems described herein by creating training/tutorial videos, navigations; help guides and enabling social behavior on the network application. Since the network application runs inside or within the embedded browser of the client application, the present solution can cause the client application or the embedded browser to add training videos/tutorials for first time users of the network application. Furthermore, the present solution can cause the client application or the embedded browser to determine the specific forms in the network application workflow and add help text on certain forms and specific text areas of the forms. Moreover, the present solution can cause the client application or the embedded browser to add specific social options like emoji, likes, and custom messages on top of the forms as well as add or provide the autofill suggestions in the form with the overlay that can be then inserted in the form.

As will be described herein, a client application on a client device can be configured to establish a session to a network application accessed via an embedded browser of the client application. The embedded browser of the client application may receive and display a web page of the network application. The client application may identify one or more overlays to be displayed over the web page in the embedded browser based on one or more conditions or policies. The client application may display the one or more overlays over the web page in the embedded browser. In certain embodiments, the embedded browser may display the one or more overlays over the web page or contents of the web page. In some embodiments, the client application can receive and maintain data relating to the display of the one or more overlays over the web page. This data could be further utilized to modify future overlay content. The functionality described herein that is performed by the client application can be managed, handled or provided by an overlay agent of the client application. The overlay agent and its functionality are further described with respect to FIG. 11.

In some embodiments, the client application can include an overlay agent that can communicate with an overlay service of the first entity that provided the client application to one or more client devices. The overlay services of the first entity can generate, maintain, modify, update, or manage the overlay content that is provided to the client application for presentation via the embedded browser of the client application. The overlay services and its functionality are further described with respect to FIG. 12.

Figure 11:
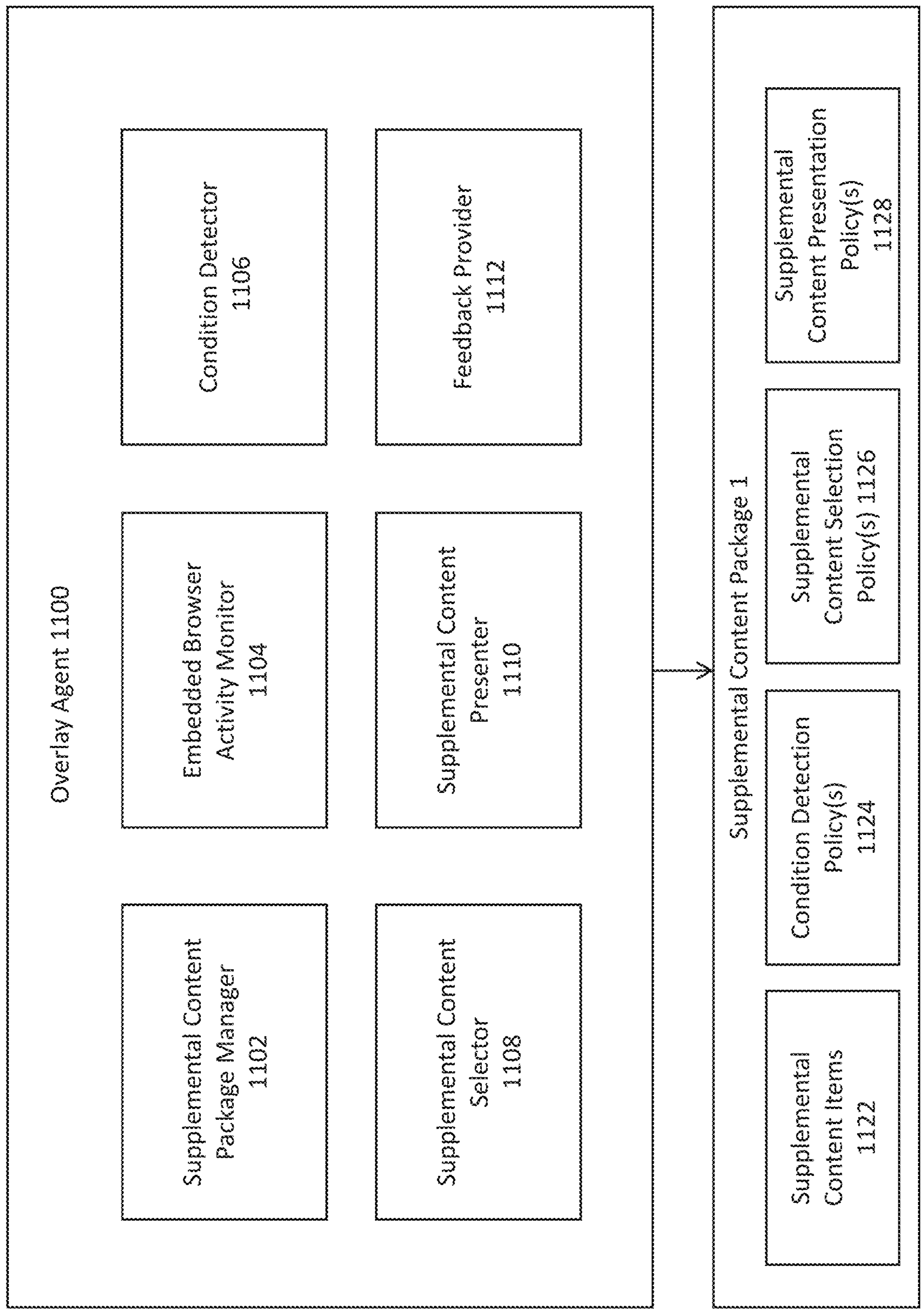
FIG. 11 is a block diagram of an example embodiment of an overlay agent executing on a client application for managing the display of overlay content and providing feedback.

Referring to FIG. 11, depicted is a block diagram of one embodiment of an overlay agent of a client application for managing the display of overlay content and providing feedback relating to the overlay content. Overlay agent 1100 may be a part of the client application and can include a supplemental content manager 1102, an embedded browser activity monitor 1104, and/or a condition detector 1106. The overlay agent 1100 may also include a supplemental content selector 1108, a supplemental content presenter 1110, and/or a feedback provider 1112.

Figure 12:
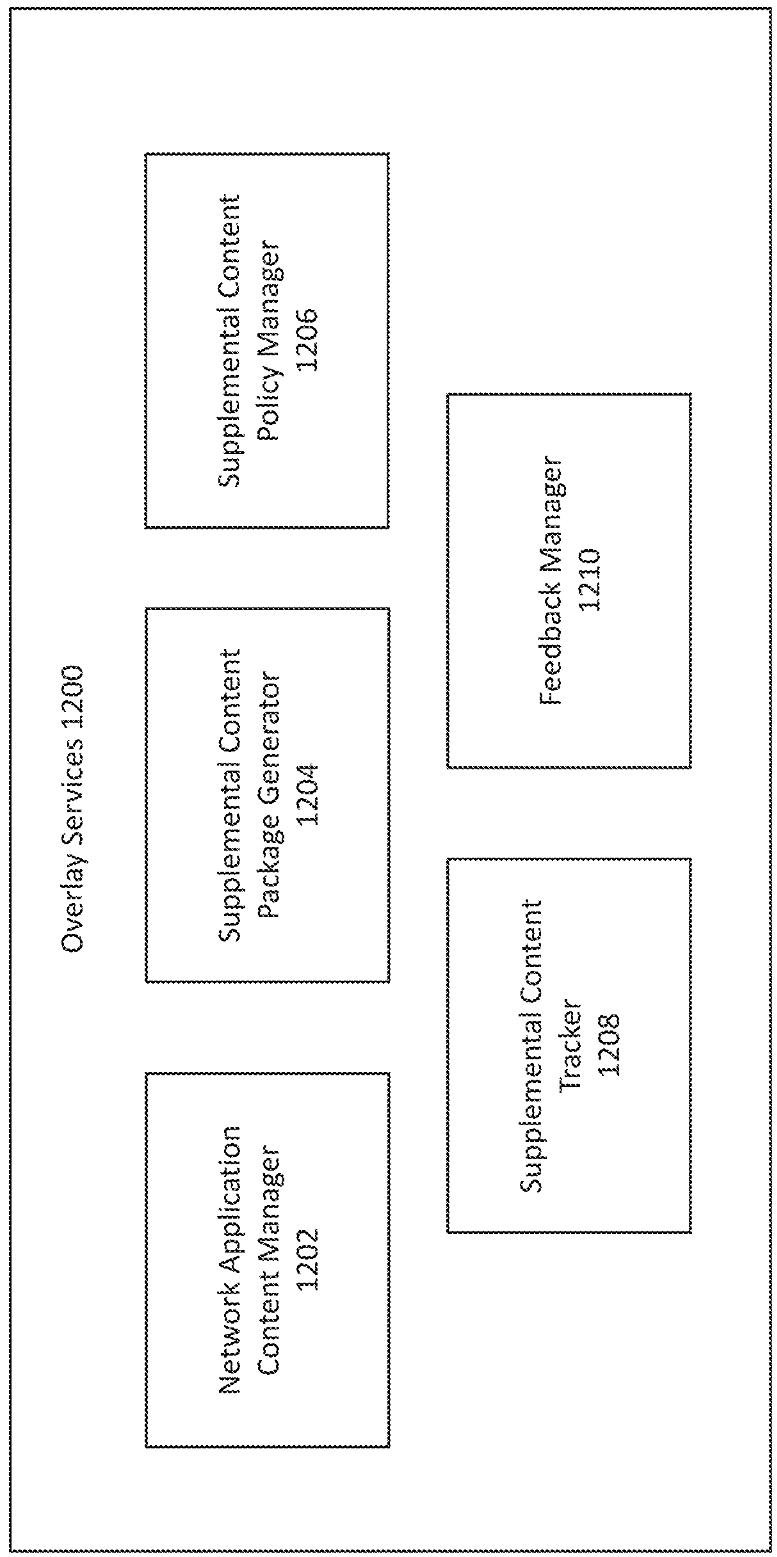
FIG. 12 is a block diagram of an example embodiment of an overlay service of a system for managing overlay content and feedback.

Referring now also to FIG. 12, depicted is a block diagram of an example embodiment of an overlay service for managing overlay content and feedback relating to the overlay content. Overlay services 1200 may include a network application content manager 1202, a supplemental content package generator 1204, a supplemental content policy manager 1206, a supplemental content tracker 1208, and/or a feedback manager 1210. Overlay services 1200 may generate and/or manage a supplemental content package 1120.

Each of the above-mentioned elements or entities is implemented in hardware, or a combination of hardware and software, in one or more embodiments. Each component of the overlay agent 1100 may be implemented using hardware or a combination of hardware or software detailed above in connection with FIG. 1. Each component of the overlay services 1200 and supplemental content package 1120 may also be implemented using hardware or a combination of hardware or software detailed above in connection with FIG. 1. For instance, each of the elements or entities shown in FIG. 11 or FIG. 12 can include any application, program, library, script, task, service, process or any type and form of executable instructions executing on hardware (e.g., of the client device). The hardware includes circuitry such as one or more processors in one or more embodiments.

The supplemental content package manager 1102 of the overlay agent 1100 of the client application can be configured to manage a supplemental content package 1120 generated by the overlay services 1200 of the first entity that is in communication with the client application. The supplemental content package manager 1102 can be configured to request supplemental content packages from the overlay services 1200. In some embodiments, the overlay services 1200 can be configured to transmit one or more supplemental content packages 1120 to the overlay agent 1100 of one or more client applications.

The supplemental content package 1120 may include supplemental content items 1122, condition detection policies 1124, supplemental content selection policies 1126, and/or supplemental content presentation policies 1128. The supplemental content package manager 1102 can store the supplemental content package 1120 in one or more data structures (e.g., a database, a list, an array, etc.). In some embodiments, the supplemental content packages 1120 can be specific to a particular network application. In some embodiments, the supplemental content packages 1120 can be specific to a particular client application. In some embodiments, the supplemental content packages 1120 can be specific to a particular user of a client application or a type of user of the enterprise. In some embodiments, the supplemental content packages 1120 can include content that may be used to assist one or more users navigate the network application.

The supplemental content package generator 1204 can be configured to identify one or more supplemental content items that can be used to present on a client application. The content items can be generated by the first entity such that the content items can be specific to the enterprise associated with the first entity. In this way, enterprises that have customized solutions can be used to present content items that are specific to the enterprise as opposed to generic content items generated by the entity providing the network application in which case, the generic content items are generic across multiple enterprises.

In some embodiments, the supplemental content items 1122 may include the overlay content to be displayed over a web page in the embedded browser of the client application. Supplemental content items 1122 may be used to assist and engage users when interacting with the web page in the embedded browser. In some embodiments, the overlay content may include training and/or tutorial videos. The overlay content can include navigational flows and/or help guides. In certain embodiments, the overlay content may include text autofill suggestions and/or help text to be used on a form of a web page. In some cases, overlay content may include social behavior items (e.g., emoticons, like buttons, custom messages, etc.).

In some embodiments, the supplemental content items 1122 may include overlay content relating to custom workflows. The custom workflows may be specific to a user. The custom workflow may be specific to a particular group or team. The custom workflow may be specific to users belonging to a particular job title, job role, or other defined characteristic.

The supplemental content items can be presented in accordance to one or more policies. These policies can be included in the supplemental content package. In some embodiments, the supplemental content items can be associated with the one or more policies 1124-1128.

Policies (e.g., condition detection policies 1124, supplemental content selection policies 1126, and supplemental content presentation policies 1128) may be included in the supplemental content package 1120. The supplemental content package 1120 may contain a data structure (e.g., a database) for each of the condition detection policies 1124, supplemental content selection policies 1126, or supplemental content presentation policies 1128. The policies may be managed by the supplemental content policy manager 1206 of the overlay service 1200. Details regarding the supplemental content policy manager 1206 are provided below with respect to FIG. 12.

Condition detection policies 1124 may include policies that detect various conditions in which overlay content should be displayed. Condition detector 1106 may be configured to use the condition detection policies 1124 provided by the supplemental content package 1120 to compare the condition of the current embedded browser, more specifically the current web page, to the list of condition detection policies 1124. The embedded browser activity monitor 1104 may provide the current condition of the embedded browser and/or web page to the condition detector 1106. If a condition detection policy is satisfied, the supplemental content selector 1108 may be notified to select the overlay content to be displayed. For example, condition detection policies 1124 may contain a policy for the first time use of a web page. Embedded browser activity monitor 1104 may determine that a user has visited a web page for the first time and may notify the condition detector 1106. The condition detector 1106 may determine that the conditions satisfy the first time use policy and notify the supplemental content selector 1108 to select the overlay content to be displayed. Ultimately, a tutorial overlay content may be displayed for the first time a user has visited a web page in order to provide help.

Supplemental content selection policies 1126 may include policies that determine which overlay content is to be selected to be displayed over the web page of the embedded browser. Supplemental content selection policies 1126 may be used to ensure that the appropriate overlay content is displayed over the web page. Supplemental content selector 1108 may be configured to use the supplemental content selection policies 1126 provided by the supplemental content package 1120 to compare the condition of the current embedded browser, more specifically the current web page, to the list of supplemental content selection policies 1126. The embedded browser activity monitor 1104 may provide the current condition of the embedded browser and/or web page. The supplemental content selector 1108 may also use data provided by the condition detector 1106 when comparing conditions to the supplemental content selection policies 1126. If a supplemental content selection policy is satisfied, the supplemental content presenter may be notified to select the conditions around which the selected overlay content is presented. For instance, supplemental content selection policies 1126 may contain a policy for selecting text auto fill suggestions overlay content when a form is displayed on a web page. The condition detector 1106 may determine that a form is displayed on the web page of the embedded browser. The supplemental content selection policies 1126 may determine that the conditions satisfy the form overlay content policy. Supplemental content selector 1108 may select text autofill suggestions overlay content and notify the supplemental content presenter 1110 to determine the manner in which the selected overlay content should be displayed.

Supplemental content presentation policies 1128 may include policies that dictate the presentation of overlay content. For instance, supplemental content presentation policies 1128 may determine how long overlay content is to be displayed for. Supplemental content presentation policies 1128 may also determine the appearance of the overlay content (e.g., element positions, style, etc.).

The supplemental content selector 1108 may select social behavior overlay content, such as an emoji or a like button. The supplemental content presenter 1110 may determine that the condition of social behavior overlay content being selected satisfies the social behavior overlay content selection policy. The supplemental content presenter 1110 may present the social behavior overlay content in the lower left corner of the web page the entire time that the web page is rendered in the embedded browser.

The supplemental content package manager 1102 may manage the policies for detecting conditions for presenting overlay content, selecting overlay content, and presenting overlay content. Condition detector 1106, supplemental content selector 1108, and supplemental content presenter 1110 may be configured to use the policies (e.g., stored in databases) managed by the supplemental content package manager 1102. In some embodiments, the policies for detecting conditions for presenting overlay content, selecting overlay content, and presenting overlay content can be stored in one or more data structures managed or maintained by the supplemental content package manager 1102. In some embodiments, the supplemental content package manager 1102 may provide overlay content via the embedded browser of the client application when the overlay content is to be displayed responsive to one or more conditions and/or policies being satisfied. Additional detail regarding the use of the policies and the presentation, selection and feedback of the overlay content is provided below.

The embedded browser activity manager 1104 can be configured to monitor the activity of the embedded browser and activity performed on the embedded browser by the user or activity generated in response to actions by the user. The monitored activity may include various forms of user interaction such as mouse clicks, entered text, and page visits. The embedded browser activity manager 1104 may record, log, store or otherwise maintain a log of the embedded browser activity. The embedded browser activity manager 1104 can be configured to monitor and/or record cursor positions of a pointing device, track the movement of the pointing device, monitor keystrokes or other inputs detectable by the client application, as well as monitor content displayed within the embedded browser. The embedded browser activity manager 1104 can identify a page that is accessed, an amount of time the page is presented for as well as monitor the user's behavior or interactions with the page. Based on the recorded usage, the client application can determine whether or not to present overlay content that may be of assistance to the user.

The condition detector 1106 can be configured to detect conditions for which overlay content should be displayed. In some embodiments, the condition detector 1106 can access, monitor, analyze or otherwise use the monitored embedded browser activity to determine if a particular condition has occurred. The condition detector 1106 can determine if a particular condition has occurred responsive to applying one or more of the condition detection policies 1124 maintained by the overlay agent 1100. In some embodiments, the condition detection policies 1124 can be included in a supplemental content package 1212. In some embodiments, the client application or the overlay agent 1100 may receive, maintain, or otherwise have access to one or more condition detection policies from one or more sources.

The condition detector 1106 can be configured to compare the monitored embedded browser activity of the embedded browser to one or more conditions represented by a policy. In the case that monitored embedded browser activity of the embedded browser satisfies one or more of the condition detection policies 1124, the condition detector 1106 may notify the supplemental content selector 1108 to trigger the selection of overlay content. For instance, the condition detector 1106 may receive notice from the embedded browser activity monitor 1104 that a user is using the network application for the first time. The supplemental content package 1120 stored in the supplemental content package manager 1102 may maintain a condition detection policy for first time use. The condition detector 1106 may determine that the notice received from the embedded browser activity monitor 1104 satisfies the first time use condition detection policy. The condition detector 1106 may then notify the supplemental content selector 1108 to select overlay content to be displayed.

The supplemental content selector 1108 can be configured to select overlay content, such as supplemental content items 1122 responsive to determining or receiving an indication that the embedded browser activity satisfies one or more condition detection policies 1124. The supplemental content selector 1108 can be configured to select an overlay content from a plurality of candidate overlay content maintained by the client application for presentation responsive to the satisfaction of the one or more condition detection policies 1124. In some embodiments, the supplemental content selector 1108 can use one or more supplemental content selection policies 1126 to select a suitable overlay content from the plurality of candidate overlay content. For example, in conjunction with a first time use condition detection policy, there may be a supplemental content selection policy 1126 including one or more rules for selecting a tutorial overlay content when a user is using or accessing a network application for the first time. It should be appreciated that the embedded browser activity monitor 1104 is configured to detect a number of times a user has accessed a network application such that the condition detector 1104 can detect that the user is accessing the network application for the first time.

Supplemental content presenter 1110 can be configured to present the overlay content over the web page via the embedded browser of the client application. The overlay content to be presented may be selected by the supplemental content selector 1108. In some embodiments, the supplemental content presenter 1110 may use supplemental content presentation policies 1128 stored in the supplemental content package manager 1102 to determine the presentation of the supplemental content. For example, when displaying a tutorial overlay, there may be a supplemental content presentation policy including rules to display the tutorial overlay until the user clicks the exit button.

The supplemental content presenter 1110 can be configured to present the overlay content according to one or more supplemental content presentation policies 1128. The supplemental content presentation policies 1128 can include rules indicating how long a supplemental content item 1122 is to be displayed, a location at which the supplemental content item 1122 is to be displayed, a size at which to display the supplemental content item 1122, as well as identifying one or more other visual characteristics in which to display the supplemental content item 1122. In some embodiments, the supplemental content item can be an audio content item. In some such embodiments, the supplemental content presentation policies 1128 can include rules indicating when to play the audio content item, a volume at which to play the audio content item, among others.

The feedback provider 1112 can be configured to collect data relating to the display of the overlay content as well as any interactions the user had with the overlay content. The feedback provider 1112 is further configured to transmit the collected feedback to the overlay services 1200. By collecting feedback, the overlay services can maintain statistics regarding the overlay content, its usage, performance and effectiveness. For example, the number of page clicks, text entered, or buttons clicked may be recorded.

In some embodiments, the feedback provider 1112 of the client application can transmit the statistics relating to the display of the one or more overlays to the overlay services 1200. The overlay services can collect the statistics received from the plurality of client applications that provided overlays for a network application and share the statistics with the server hosting the network application. In some embodiments, the overlay services 1200 can aggregate the statistics, determine the performance of each of the overlays based on interactions with the overlays (included in the statistics) and use the performance information to inform the server or the vendor providing the network application about the performance of the network application based on the use of the overlays.

In some embodiments, the feedback provider 1112 can aggregate statistics relating to social behavior overlay objects as well as other overlay objects to determine user engagement analytics As described herein, the overlay objects can be provided by, generated, designed and presented via the overlay services 1200 independent of the server hosting the network application or the vendor of the network application.

In some embodiments, the customization to the network application, for instance, the addition or inclusion of overlays, can be done at the source by independent service vendors or by consultants who customize the network application at the source of the network application. The customization using overlays can be low touch and in some embodiments, does not affect the code of the network application at all such that front end modifications or customizations to the network application do not alter the code of the network application.

In this way, enterprises using the network application can be empowered to add additional custom behaviors to the network application, which may otherwise not be available within the application, for instance, in the default network version of the network application. In some embodiments, the customization provided to the network application can be enabled as a per application workflow overlay on top of the network application. In some embodiments, different users within the enterprise may receive different custom overlays specific to the user. For instance, the customizations can be user specific or specific to a particular group within the enterprise, a particular segment of the enterprise, or specific to a particular title, job position, or other criteria.

The performance of each of the social behavior overlay objects provided by the client applications can be tracked. In particular, the client application, or the feedback provider, can track a number of the times an overlay object is displayed, a number of times an interaction with the overlay object occurs, a type of interaction, among others. The interactions can be tracked and used by the feedback provider to be shared with the overlay services 1200. The overlay services can then share aggregated statistics based on the performance of the overlay objects to the network application vendor or server hosting the network application or share the statistics with an independent service vendor or other entity that may use the statistics to generate additional overlay content or modify the existing overlay content based on the feedback. As such, end users net promoter scores (NPS) or other metrics relating to the use of the overlay objects can be used by the independent server vendors, the enterprise, or the provider of the network application as best practices or to establish or update best practices.

Referring now again to FIG. 12, the network application content manager 1202 can be configured to manage content related to network applications accessed via the embedded browser of the client application. In some embodiments, the network applications are hosted on a server different from the server of the enterprise that provides the client application to the client device or otherwise communicates with the client application on the client device. The network application content manager 1202 may receive, generate, or otherwise access content relating to one or more network applications. In some embodiments, the network application content manager 1202 may establish more or more sessions between the overlay service and the network application to receive content from the network application or to determine a status of the network application.

The network application content manager 1202 can receive and maintain content items that can be used as overlay content or to generate overlay content that can then be transmitted to and presented by the client application. The network application content manager 1202 can maintain one or more data structures in which the content received from or relating to the network applications can be stored and made accessible to the supplemental content package generator 1204 or any other module of the overlay services 1200.

The supplemental content package generator 1204 can be configured to generate one or more supplemental content packages 1120. As described above, the supplemental content package 1120 may include supplemental content items 1122, condition detection policies 1124, supplemental content selection policies 1126, and/or supplemental content presentation policies 1128. The supplemental content package manager 1102 can store the supplemental content package 1120 in one or more data structures (e.g., a database, a list, an array, etc.).

The supplemental content package generator 1204 can be configured to identify one or more supplemental content items that can be used to present on a client application. The content items can be generated by the first entity such that the content items can be specific to the enterprise associated with the first entity. In this way, enterprises that have customized solutions can be used to present content items that are specific to the enterprise as opposed to generic content items generated by the entity providing the network application in which case, the generic content items are generic across multiple enterprises.

In some embodiments, the supplemental content items 1122 may include the overlay content to be displayed over a web page in the embedded browser of the client application. Supplemental content items 1122 may be used to assist and engage users when interacting with the web page in the embedded browser. In some embodiments, the overlay content may include training and/or tutorial videos. The overlay content can include navigational flows and/or help guides. In certain embodiments, the overlay content may include text autofill suggestions and/or help text to be used on a form of a web page. In some cases, overlay content may include social behavior items (e.g., emoticons, like buttons, custom messages, custom workflows, etc.).

In some embodiments, the supplemental content packages 1120 can be specific to a particular network application. In some embodiments, the supplemental content packages 1120 can be specific to a particular client application. In some embodiments, the supplemental content packages 1120 can be specific to a particular user of a client application or a type of user of the enterprise. In some embodiments, the supplemental content packages 1120 can include content that may be used to assist one or more users navigate the network application.

The supplemental content policy manager 1206 can be configured to generate, associate, manage, or assign one or more policies to one or more supplemental content items 1122. The supplemental content policy manager 1206 can be configured to generate a condition detection policy including one or more rules identify one or more conditions upon which to present one or more content items. For instance, the condition can relate to a user being a first time user of a network application. Another condition can include a user spending more than a predetermined amount of time on a page, or a portion of a page, or on a field in a form. Another condition can include a user entering incorrect or invalid information more than a predetermined time. The condition can be based on the monitored embedded browser activity, user interactions, or a profile of a user maintained by the client application or the overlay service.

The supplemental content policy manager 1206 can be further configured to generate, associate, manage, or assign one or more supplemental content selection policies 1126 for one or more conditions or one or more supplemental content items 1122. For instance, the supplemental content policy manger 1206 can be further configured to apply a selection policy to a user tutorial content item that is configured to cause selection of the user tutorial content item when the user is determined to be a first time user of a network application. The supplemental content policy manager 1206 can further maintain the association between the content item and the selection policy and share the association with one or more client applications via the supplemental content package 1120. Supplemental content selection policies 1126 may include policies that determine which overlay content is to be selected to be displayed over the web page of the embedded browser. Supplemental content selection policies 1126 may be used to ensure that the appropriate overlay content is displayed over the web page.

The supplemental content presentation manager 1206 can be further configured to generate, associate, manage, or assign one or more supplemental content presentation policies 1126 for one or more conditions or one or more supplemental content items 1122. Supplemental content presentation policies 1128 may include policies that dictate the presentation of overlay content. For instance, supplemental content presentation policies 1128 may determine how long overlay content is to be displayed for. Supplemental content presentation policies 1128 may also determine the appearance of the overlay content (e.g., element positions, style, etc.). The supplemental content presentation policies 1128 can include rules indicating how long a supplemental content item 1122 is to be displayed, a location at which the supplemental content item 1122 is to be displayed, a size at which to display the supplemental content item 1122, as well as identifying one or more other visual characteristics in which to display the supplemental content item 1122. In some embodiments, the supplemental content item can be an audio content item. In some such embodiments, the supplemental content presentation policies 1128 can include rules indicating when to play the audio content item, a volume at which to play the audio content item, among others.

The supplemental content tracker 1208 may track various details of the interaction with the displayed overlay content. The supplemental content tracker 1208 can be configured to track the number of times a particular overlay content has been presented, a number of users to which it has been presented, a position on a display at which the content was presented, a timestamp at which it was presented, among other information that may be relevant or useful for monitoring the performance or usage of the supplemental content item. Details of the interaction with the displayed overlay content may include, but is not limited to, button clicks, entered text, page visits, and/or suggestion usage. The supplemental content tracker 1208 may send statistics to the feedback provider 1112 to be handled further.

The feedback manager 1210 may manage feedback received regarding the presented overlays. The feedback may be received from the feedback provider 1112 of the overlay agent 1100. Feedback may include various statistics collected by the supplement content tracker 1208. Contents of the feedback manager 1210 may be used to modify overlay content and its respective policies. The feedback manager 1210 may store its contents in a data structure, such as a database, list, or enumerator. In some embodiments, if the feedback manager 1210 determines that multiple users are still having issues navigating the network application despite being displayed a tutorial on how to navigate the network application, the feedback manager 1210 can determine that the performance score of the tutorial content item is below a certain threshold and may determine to replace the tutorial or flag the tutorial for an administrator to modify the tutorial. In some embodiments, users of client applications that viewed the tutorial may provide feedback that can be aggregated by the feedback manager 1210, which can then be used to modify or improve the tutorial.

Figure 13:
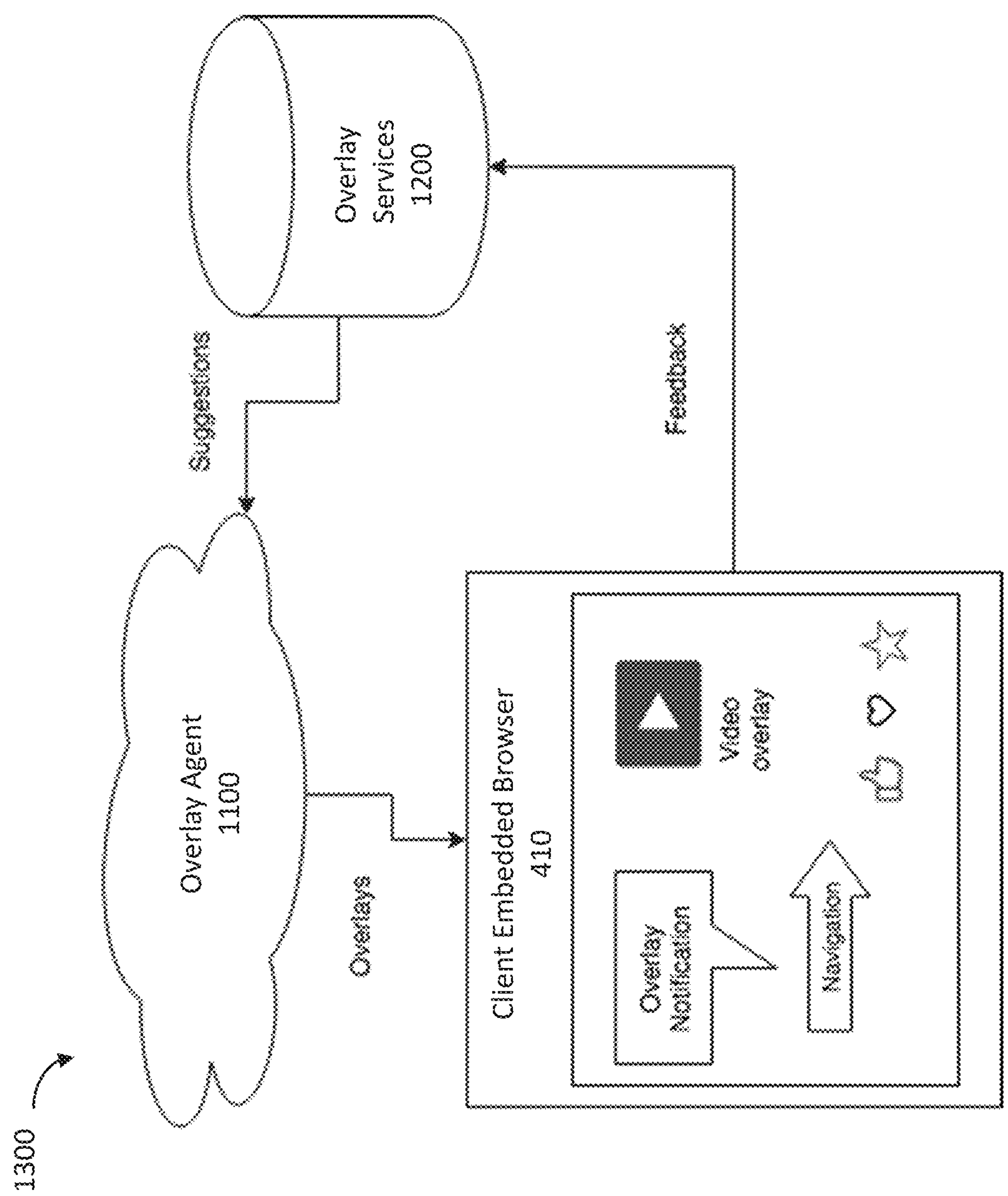
FIG. 13 is an example embodiment of a system for displaying overlay content and receiving feedback.

Referring to FIG. 13, depicted is an example embodiment of a system 1300 for displaying overlay content and receiving feedback. System 1300 may include an overlay services 1200, an overlay agent 1100, and/or a client embedded browser 410. The overlay services 1200 may include one or more elements of any embodiment of the overlay services 1200 described above in connection with at least FIG. 12. The overlay agent 1100 may include one or more elements of any embodiment of the overlay agent 1100 described above in connection with at least FIG. 11. The client embedded browser 410 may include one or more elements of any embodiment of the embedded browser 410 described above in connection with at least FIGS. 4 and 8.

Each of the above-mentioned elements or entities is implemented in hardware, or a combination of hardware and software, in one or more embodiments. Each component of system 1300 may be implemented using hardware or a combination of hardware or software detailed above in connection with FIG. 1. For instance, each of these elements or entities can include any application, program, library, script, task, service, process or any type and form of executable instructions executing on hardware (e.g., of the client device). The hardware includes circuitry such as one or more processors in one or more embodiments.

The client embedded browser 410 may be executed (e.g., via one or more processors described in connection with at least FIG. 1) on a client device 410. The client embedded browser 410 may be a standalone browser application. In some embodiments, the embedded browser may be integrated within a client application. The client embedded browser 410 may provide access to one or more network applications. The one or more network application may include any type or form of network application 406 described above in connection with at least FIGS. 2-5, 7, and 8.

Overlay services 1200 of system 1300 may generate overlay content (e.g., supplemental content items 1122 in the supplemental content package 1120) and maintain detection conditions and policies (e.g., condition detection policies 1124 in the supplemental content package 1120) for which overlay content should be displayed. Upon detecting a condition, the overlay agent 1100 may provide the client embedded browser 410 with one or more overlays to be displayed over the web page. The client embedded browser 410 may collect data regarding the overlays and the overlay services 1200 may receive the data feedback. The overlay services 1200 may use the feedback to modify the current overlay content and their respective conditions and policies. One or more components of the overlay services 1200 described above in connection with FIG. 12 may be used to receive feedback and modify the supplemental content package 1120.

Figure 14:
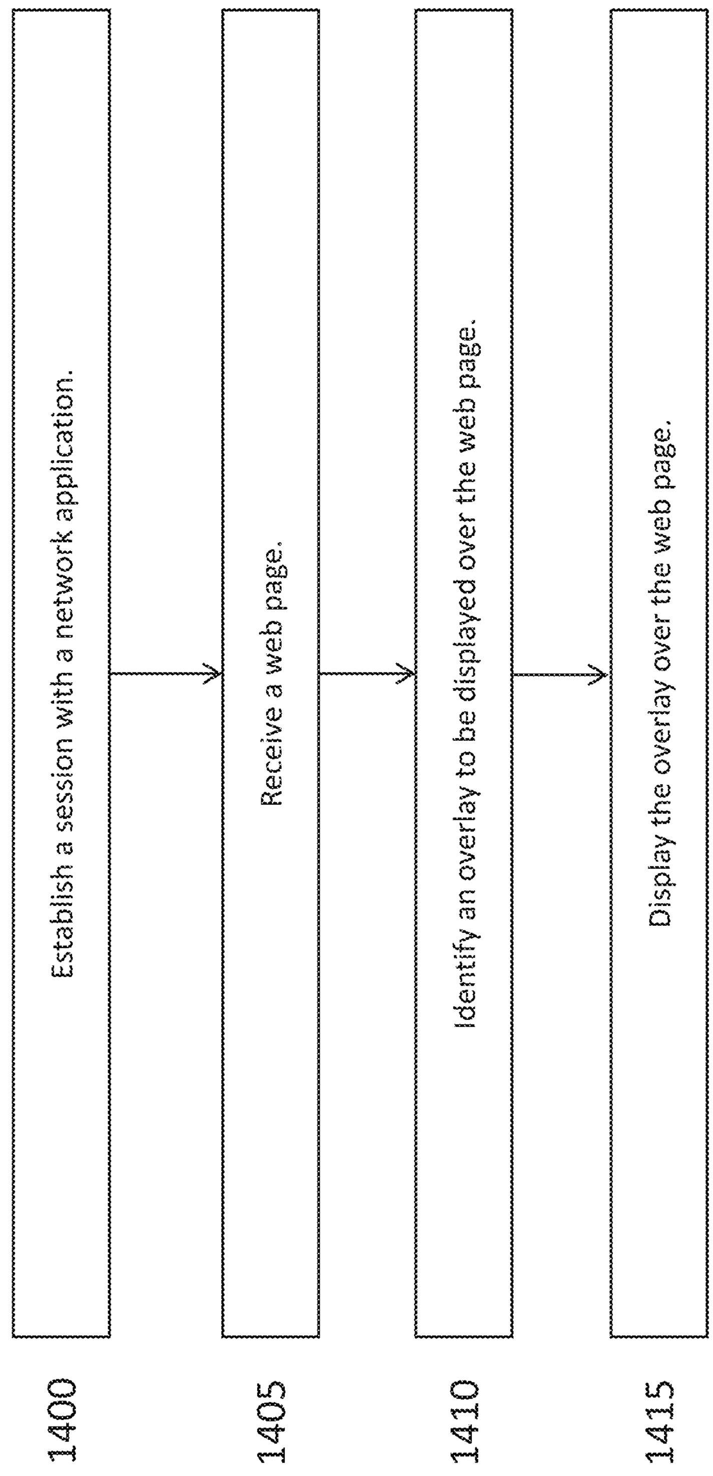
FIG. 14 is an example process flow for displaying overlay content.

Referring to FIG. 14, depicted is a flow diagram of one embodiment of a method for displaying overlay content. The functionalities of the method may be implemented using, or performed by, the components detailed herein in connection with FIGS. 1-13 and 15. In brief overview, a client application can establish a session with a network application (1400). An embedded browser of the client application can receive a web page (1405). The client application can identify an overlay to be displayed over the web page (1410). The client application can display the overlay over the web page (1415).

Referring now to operation (1400), and in some embodiments, a client application can establish a session with a network application. A client application may establish a session to a network application to be accessed via an embedded browser of the client application on a client device. In some embodiments, the network application may be an application hosted on a server accessed by the client device via a network. The server may be a different entity than the entity of the client device. In some embodiments, the embedded browser is integrated into the client application and the network application can be accessed via the embedded browser.

In certain embodiments, the established session between the client application and the network application may be a secure session. The session may be for provisioning a session of the network application hosted and/or executing on the server, between the server and the client application. The session can be established using Citrix high definition user experience (HDX) protocol (e.g., as an HDX session), or independent computing architecture (ICA) protocol, or remote desktop protocol (RDP)). The session may be a secure browser session, that conveys network application data rendered on a secure browser hosted on the server, to the client application. A variety of network protocols may be used to communicate network application data through the session, such as Secure HTTP (S-HTTP or HTTPS), Transport Layer Security (TLS), and Secure Socket Layer (SSL).

In some embodiments, the client application may establish one or more sessions to one or more network applications. For instance, the client application may establish a single session to a plurality of network applications (e.g., 5 network applications). In some cases, the client application may establish a plurality of sessions (e.g., 3 sessions) to a single network application. Additionally, as previously mentioned, the client application may establish a single session to a single network application.

Referring now to operation (1405), and in some embodiments, an embedded browser of the client application can receive a web page. In some embodiments, the embedded browser of the client application may receive and display a web page of a network application. The web page displayed may be from a plurality of web pages provided by one or more network applications. The web page displayed may be a form, contain text fields, contain buttons, and/or contain plain text. The displayed web page may be used to retrieve information from a user or may be used to inform the user of various information.

In some embodiments, the client application may receive a web page in response to an action. Upon establishing a session (e.g., operation 1400) between the client application and a network application, the client application may receive a home page to display. In some cases, a web page may be received in response to a button click on an existing displayed web page. For example, a next arrow button may be clicked on an existing displayed web page. This may trigger a web page next in the sequence to be displayed.

In certain embodiments, the activity of the embedded browser, and in some embodiments, the activity on the web page may be monitored by the embedded browser activity monitor 1104. Activity such as button clicks, entered text, videos watched, and/or time spent on a web page may be monitored. The embedded browser activity monitor 1104 may help determine the current conditions of the web page, embedded browser, and/or client application. The embedded browser activity monitor 1104 may send the current conditions to the condition detector 1106 to identify an overlay to be displayed over the web page of the embedded browser, for example in operation (1410).

Referring now to operation (1410), and in some embodiments, the client application can identify an overlay to be displayed over the web page. Policies, such as condition detection policies 1124, supplemental content selection policies 1126, and/or supplemental content presentation policies 1128 may be used to select the overlay content and the conditions under which it's displayed. Condition detector 1106 may receive notice of a certain condition from the embedded browser activity monitor 1104. The provided condition may be compared against the list of condition detection policies 1122. Pending a condition detection policy 1124 is satisfied, the supplemental content selector 1108 can be notified to select the overlay content. The supplemental content selector 1108 may be use the satisfied condition detection policy 1124 and the current condition of the web page, embedded browser and/or client application to compare against the list of supplemental content selection policies 1126. Pending a supplemental content selection policy is satisfied, the supplemental content selector 1108 may notify the supplemental content presenter 1110 to determine the conditions around which the overlay content will be presented. Using the previously discussed conditions and/or satisfied policies, the supplemental content presenter may compare those to the list of supplemental content presentation policies 1126. Upon determining that at least one supplemental content presentation policy is satisfied, the supplemental content presenter 1110 can determine how the overlay content should be displayed.

The client application may identify one or more overlays to be displayed over the web page in the embedded browser. In some embodiments, one or more overlays may be identified to be displayed if one or more policies were satisfied.

For example, embedded browser activity monitor 1104 may determine that a user is visiting a web page first the first time and that the web page contains a form. Embedded browser activity monitor 1104 may notify condition detector 1106 of these conditions and the condition detector 1106 may determine that these conditions satisfy two of the condition detection policies. Ultimately, a tutorial overlay content and text autofill suggestions overlay content may be selected to be displayed over the web page in the embedded browser.

In some embodiments, the overlay may be provided to the client application by a different entity than the entity of the server hosting the network application. For example, the overlay may be provided by supplemental content package manager 1102 of overlay agent 1100 described in reference to FIG. 11. One or more overlays may be provided to the client application to be displayed. Supplemental content selector 1108 may select the overlay content and supplemental content presenter 1110 may receive the selected overlay content to display, for example in operation (1415).

Referring now to operation (1415), and in some embodiments, the client application can display the overlay over the web page (1415). The client application may display the selected overlay (e.g., from operation 1410) over the web page in the embedded browser. In some embodiments, overlay agent 1100 may display the overlay over the web page. For instance, the supplemental content presenter 1110 may present the overlay content to be displayed over the web page in the embedded browser of the client application. In certain embodiments, the embedded browser of the client application may display the overlay over the web page.

In some embodiments, the client application may display one or more overlays over the web page. The one or more overlays may serve the same purpose or may server differing purposes. For example, the client application may display a tutorial overlay as well as a social feedback overlay over the same web page in the embedded browser. On the contrary, the client application may display two different tutorial overlays over the same web page in the embedded browser. One tutorial overlay may be for navigation while the other tutorial overlay may be for filling out a form.

Upon displaying the overlay over the web page, a user may interact with the web page and its respective overlay(s). The user may be re-directed to a new web page, for example due to activating a link or button via a mouse click. In the case that a new web page is rendered in the embedded browser of the client application, the overlay content may be removed. Pending the new received web page (e.g., operation 1405), the client application may identify new overlay content to be displayed over the web page (operation 1410). In some embodiments, the original overlay content may remain displayed over the new web page.

Figure 15:
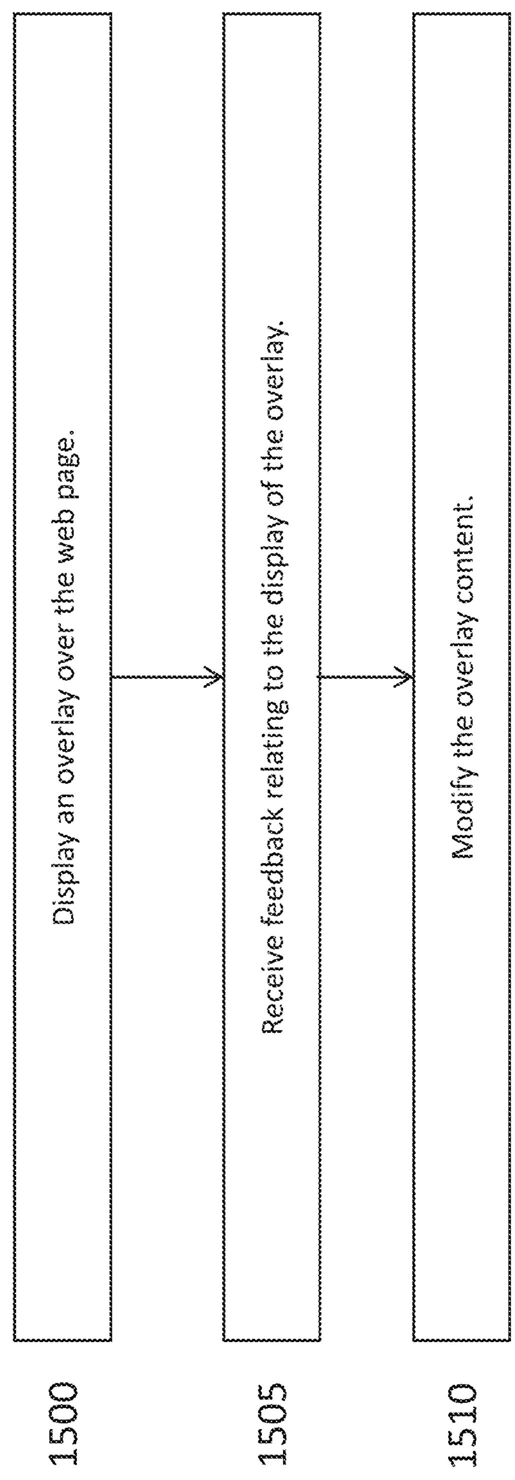
FIG. 15 is an example process flow for modifying overlay content.

Referring to FIG. 15, depicted a flow diagram of one embodiment of a method for modifying overlay content. The functionalities of the method may be implemented using, or performed by, the components detailed herein in connection with FIGS. 1-14. In brief overview, a client application can display an overlay over the web page (1500). The client application can receive feedback relating to the display of the overlay (1505). The client application can modify the overlay content (1510).

Referring now to operation (1500), and in some embodiments, a client application can display an overlay over the web page. Similar to operation (1415) described in reference to FIG. 14, the client application may display selected overlay content over the web page rendered in the embedded browser of the client application. Overlay agent 1100 may present the overlay content via the supplemental content presenter 1110. The overlay content may be displayed over the web page in the embedded browser and may be configured to allow user interaction.

In some embodiments, the overlay content selected to be displayed may be selected by a step similar to operation (1410) described in reference to FIG. 14. Pending the conditions and/or policies mentioned in reference to at least FIGS. 12 and 14, overlay content may be selected to be displayed by the embedded browser of the client application. A particular condition may trigger a specific overlay to be displayed. For example, the first time a web page is rendered, a tutorial overlay may be selected. By way of another example, a web page containing a form may trigger a text field suggestion overlay to be selected.

In some embodiments, the client application may display one or more overlays over the web page. The one or more overlays may be similar and serve the same purpose. In certain embodiments, the one or more overlays may vary and serve differing purposes. For instance, a social feedback overlay may be displayed along with a navigational flow overlay. In other cases, a tutorial overlay may be displayed along with another tutorial overlay. The one or more overlays may be displayed until acted upon and/or a new web page is received and displayed.

Referring now to operation (1505), and in some embodiments, the client application can receive feedback relating to the display of the overlay. Upon presenting overlay content and receiving user interaction, overlay agent 1100 may collect and send feedback to the overlay services 1200 via the feedback provider 1112. The overlay agent 1100 may use the received feedback, for example in operation (1510). The received feedback may be used to modify subsequent overlay content and/or may the condition detection, supplemental content selection, and supplemental content presentation policies.

In certain embodiments, the client application may maintain statistics relating to the display of the overlay content over the web page in the embedded browser. The statistics may be stored in a data structure, such as an array or a list. In some embodiments, the statistics may be stored in a database. The client application may maintain statistics in the supplemental content tracker 1208 and/or feedback manager 1210. The supplemental content tracker 1208 may have a data structure for each category of data. For example, data relating to social feedback may be stored in a different data structure than data relating to text field autofill feedback.

Feedback received and statistics maintained may provide insight relating to the display of the overlay. Information regarding button clicks and/or link clicks may be recorded. In some case, text from text fields and/or other form fields may be recorded. In some embodiments, supplemental content tracker 1208 may track the information.

Referring now to operation (1510), and in some embodiments, the client application can modify the overlay content. Responsive to receiving feedback indication (step 1505), the overlay services 1200, specifically the feedback manager 1210, may manage the feedback regarding the overlay content. The feedback manager 1210 may modify the overlay content and its respective conditions and/or policies in the supplemental content package 1120. Modifying the overlay content may be done to increase the usability of the web page and/or better serve the user.

In some embodiments, overlay content may be added to or removed from existing overly content. Overlay content may be modified to better suit the web page next time it is displayed. For example, if text autofill suggestions prove to not be valuable, the text autofill suggestion overlay content may be removed, for example from the supplemental content package 1120. In addition, the condition detection, supplemental content selection, and/or supplemental content presentation policies may be modified. For example, a new policy may be added. In some cases, an existing policy may be removed if it is deemed unnecessary (e.g., if a tutorial proves to not be helpful). In other cases, an existing policy may be modified to include more use cases and/or cover more overlay content.

In some embodiments, steps 1500-1510 of the current process may be used in conjunction with steps 1400-1415 of the process depicted in FIG. 14. For example, steps 1415 and 1500 may represent displaying the same overlay content. Upon receiving the web page (1405) and presenting the overlay content over the web page (1415 and 1500), feedback may be received (1505) and overlay content may be modified (1510).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method for displaying one or more overlays for a network application accessed via an embedded browser of a client application, the method comprising:

(a) establishing, by a client application on a client device, one or more sessions to one or more network applications accessed via an embedded browser of the client application, the client application maintaining a plurality of overlays;

(b) receiving, by the embedded browser of the client application, a web page of a network application of the one or more network applications;

(c) identifying, by the client application, from the plurality of overlays based at least on the network application, one or more overlays of the client application to be displayed over the web page of the network application in the embedded browser; and (d) displaying, by the client application, the one or more overlays over the web page in the embedded browser.

2. The method of claim 1, wherein the embedded browser is integrated into the client application.

3. The method of claim 1, wherein the network application comprises an application hosted on a server accessed by the client device via a network, and wherein an entity of the server is different from an entity of the client device.

4. The method of claim 1, wherein (b) further comprises identifying a form of the web page and wherein (c) further comprises identifying the one or more overlays of the client application based on the form of the webpage of the network application.

5. The method of claim 1, wherein the one or more overlays comprises a navigation element prompting the user to interact with a portion of the web page.

6. The method of claim 1, wherein (c) further comprises identifying the one or more overlays of the client application based on a policy for the network application.

7. The method of claim 1, wherein (d) further comprising displaying, by the embedded browser, the one or more overlays.

8. The method of claim 1, wherein the one or more overlays are provided to the client application via a second entity different from an entity of a server hosting the network application.

9. The method of claim 1, further comprising (e) maintaining, by the client application in a data structure, statistics relating to the display of the one or more overlays over the web page in the embedded browser.

10. The method of claim 9, further comprising (f) transmitting, by the client application, the statistics relating to the display of the one or more overlays to a second entity different from an entity of a server hosting the network application, the statistics used by the second entity to inform i) a provider of the network application to update the network application based on the statistics received from a plurality of client applications including the client application or ii) an entity generating the overlays to update one or more overlays based on the statistics received from a plurality of client applications including the client application.

11. A system for displaying one or more overlays for a network application accessed via an embedded browser of a client application, the system comprising:

a client application on a client device in communication with a first server of a first entity, via an embedded browser of the client application, the client application maintaining a plurality of overlays, and the client application configured to:

establish one or more sessions to one or more network applications accessed via an embedded browser of the client application;

receive, by the embedded browser of the client application, a web page of a network application of the one or more network applications;

identify, from the plurality of overlays based at least on the network application, one or more overlays of the client application to be displayed over the web page in the embedded browser; and display the one or more overlays over the web page in the embedded browser.

12. The system of claim 11, wherein the embedded browser is integrated into the client application.

13. The system of claim 11, wherein the network application comprises an application hosted on a server accessed by the client device via a network, and wherein an entity of the server is different from an entity of the client device.

14. The system of claim 11, wherein to identify based at least on the network application, one or more overlays of the client application to be displayed over the web page in the embedded browser, the client application is further configured to identify a form of the web page; and wherein to identify a form of the web page, the client application is further configured to the one or more overlays of the client application based on the form of the webpage of the network application.

15. The system of claim 11, wherein the one or more overlays comprises a navigation element prompting the user to interact with a portion of the web page.

16. The system of claim 11, wherein to identify based at least on the network application, one or more overlays of the client application to be displayed over the web page in the embedded browser, the client application is further configured to identify the one or more overlays of the client application based on a policy for the network application.

17. The system of claim 11, wherein to display the one or more overlays over the web page in the embedded browser the client application is further configured to display, by the embedded browser, the one or more overlays.

18. The system of claim 11, wherein the one or more overlays are provided to the client application via a second entity different from an entity of a server hosting the network application.

19. The system of claim 11, wherein the client application is further configured to maintain in a data structure, statistics relating to the display of the one or more overlays over the web page in the embedded browser.

20. The system of claim 19, wherein the client application further configured to transmit the statistics relating to the display of the one or more overlays to a second entity different from an entity of a server hosting the network application, the statistics used by the second entity to inform i) a provider of the network application to update the network application based on the statistics received from a plurality of client applications including the client application or ii) an entity generating the overlays to update one or more overlays based on the statistics received from a plurality of client applications including the client application.

* * * * *